United States Patent [19]

Mizuno et al.

[11] Patent Number: 4,989,460
[45] Date of Patent: Feb. 5, 1991

[54] MAGNETOSTRICTION TYPE TORQUE SENSOR WITH TEMPERATURE DEPENDENT ERROR COMPENSATION

[75] Inventors: Masashi Mizuno; Katsuhiro Kojima; Yoji Ozawa; Takanobu Saito, all of Aichi; Munekatsu Shimada, Kanagawa; Masaaki Katsumata, Kanagawa; Hiroyuki Aoki, Kanagawa, all of Japan

[73] Assignees: Nissan Motor Company, Limited, Yokohama; Daidotokushuko Kabushikigaisha, Nagoya, both of Japan

[21] Appl. No.: 288,824

[22] Filed: Dec. 23, 1988

[30] Foreign Application Priority Data

Dec. 26, 1987 [JP] Japan .................. 62-331263

[51] Int. Cl.⁵ .................................. G01L 3/10
[52] U.S. Cl. .................................. 73/862.36
[58] Field of Search .......... 73/862.36, 862.63, 862.69, 73/DIG. 2

[56] References Cited

U.S. PATENT DOCUMENTS 2,557,393  6/1951  Rifenbergh ............... 73/862.36

FOREIGN PATENT DOCUMENTS 0217640  4/1987  European Pat. Off. .
0173434  9/1985  Japan ..................... 73/862.36
0245033  10/1986  Japan ..................... 73/862.36
0206421  9/1987  Japan ..................... 73/862.36
1593800  7/1981  United Kingdom .

Primary Examiner—Charles A. Ruehl
Attorney, Agent, or Firm—Foley & Lardner, Schwartz, Jeffery, Schwaab, Mack, Blumenthal & Evans

[57] ABSTRACT

A magnetostriction type torque sensor employs a plurality of detector coils arranged in axial arrangement along an objective rotary body. The detector coils are so designed and arranged as to compensate influence of temperature, particularly the error caused due to axial temperature gradient caused in the objective rotary body.

19 Claims, 16 Drawing Sheets

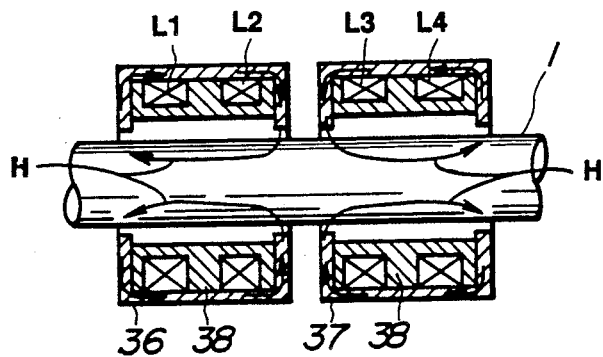
FIG.13
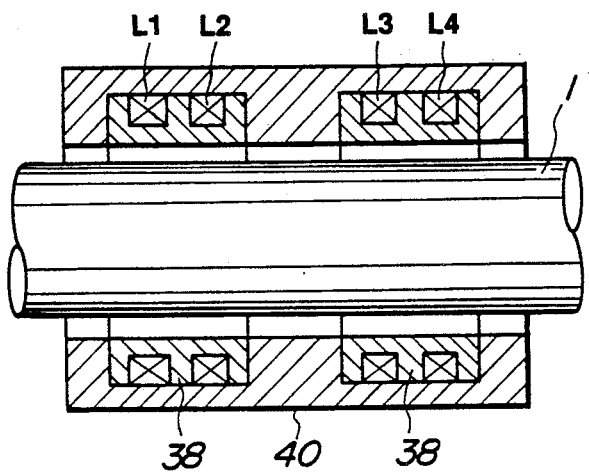
FIG.14
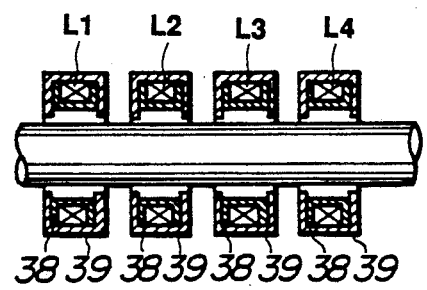
FIG.15
FIG.16
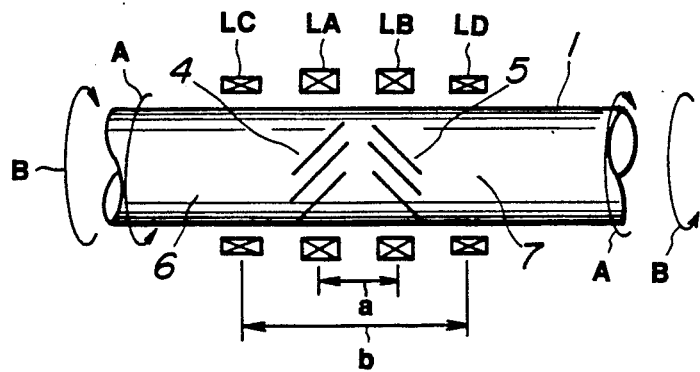

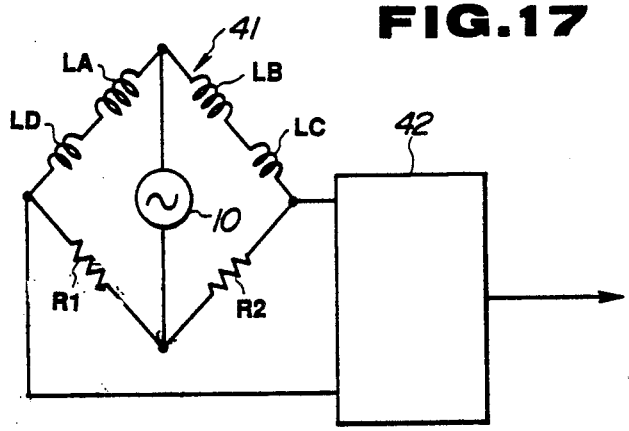
FIG.17
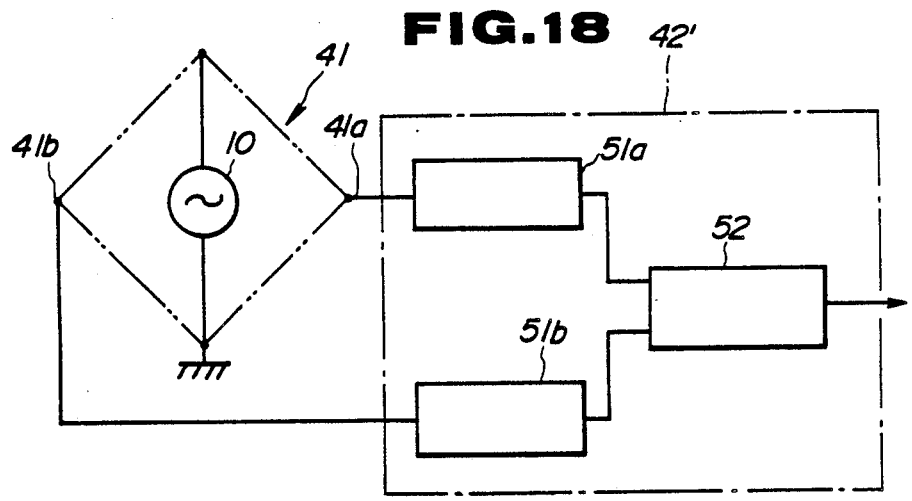
FIG.18
FIG.19
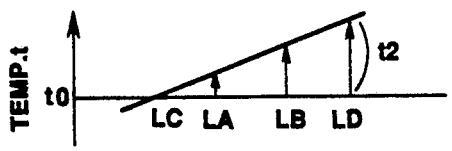
FIG.20
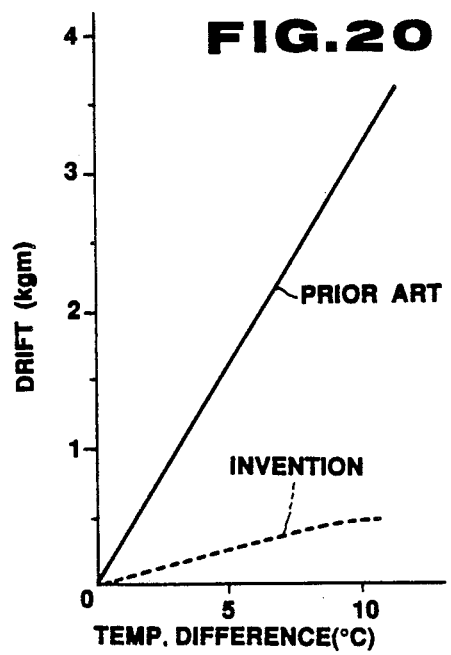

L1  L2  L3  L4

MAGNETOSTRICTION TYPE TORQUE SENSOR WITH TEMPERATURE DEPENDENT ERROR COMPENSATION

BACKGROUND OF THE INVENTION

1. Field of the Invention

The present invention relates generally to a torque sensor for monitoring a rotary torque applied to a rotating body. More specifically, the invention relates to a magnetostriction type torque sensor for detecting magnetostriction caused by application of rotary torque on the rotating body, such as a drive shaft of an automotive vehicle, a steering column shaft or a steering shaft in an automotive steering system, an input clutch shaft or other rotary shaft in an automotive power transmission, a spindle of a machine tool, a rotary shaft of an electric motor and so forth. Further particularly, the invention relates to compensating for errors caused by temperature variation in the measurement of applied torque.

2. Description of the Background Art

Japanese Patent First (unexamined) Publication (Tokkai) Showa No. 61-127952 and Japanese Patent First Publication (Tokkai) Showa No. 61-17953 disclose previously proposed torque sensors of the type which are for front contact with the rotating body in which the torque is being measured. In these prior art arrangements, one or more sensor elements are disposed about the rotating body in an automotive power transmission casing and secured to ribs, flanges or the like of the casing by way of screws or the like.

These sensor arrangements are arranged to project from their mounting sites and juxtapose the peripheral outer surface of the shaft in which torque is to be sensed and to include U-shaped cores on which exciting and measuring coils are wound. Theses torque sensors have suffered from the drawback that as they are exposed to only a portion of the rotating shaft, they tend to be subject to "eccentricity" noise which is generated when the shaft is subject to the application of torque which induces twisting deformation and causes the portion of the shaft to which the sensor is exposed to become momentarily eccentric.

On the other hand, Japanese Patent First Publication (Tokkai) Showa No. 62-185136 discloses the monitoring of a rotary torque applied to an object shaft, in which is provided axially spaced sections of magnetic anisotropy by providing mutually different directions of magnetic fields. Opposing these sections, torque detector coils are provided. The torque detector coils are so designed as to monitor magnetostriction magnitude caused by twisting deformation of the associated sections of the object shaft which is caused by application of the rotary torque. The torque detector coils are further designed to generate output signals corresponding to the detected magnetostriction magnitude.

The torque sensor shown tends to be subject to the influence of heat causing error in the measurement of the applied torque. Namely, in case the torque sensor is used for monitoring driving torque at the engine output shaft or rotary shaft in a power transmission, heat created by combustion in the engine is apt to be transmitted. Similarly, in the case of a machining tool, heat created in an electric motor tends to be transmitted to the rotary shaft. In the alternative, when the rotary shaft is supported by means of a bearing, friction between the outer periphery of the rotary shaft and the bearing tends to create heat. Such heat transmitted to the rotary shaft causes a temperature gradient in the axial direction of the rotary shaft. The temperature difference in different portions of the shaft causes a difference in magnetic permeability. This results in variation of impedance in respective detector coils to cause an error in the output signals of the coils. Such a temperature dependent error clearly degrades accuracy in measurement of the applied torque.

SUMMARY OF THE INVENTION

Therefore, it is an object of the present invention to provide a magnetostriction type torque sensor system which is free from or can reduce the influence of temperature in an objective rotary body about which an applied torque is to be monitored.

In order to accomplish the aforementioned and other objects, a torque sensor, according to the present invention, employs a plurality of detector coils in axial arrangement along an objective rotary body. The detector coils are so designed and arranged as to compensate for the influence of temperature, particularly the error caused due to an axial temperature gradient caused in the objective rotary body.

According to one aspect of the invention, a magnetostriction type torque sensor for monitoring rotational torque applied to a rotating object, comprises:

at least one magnetic anisotropy section formed in the rotating object;

a plurality of electromagnetic coils disposed in the vicinity of the rotating object, one of the electromagnetic coils opposing the magnetic anisotropy section, each of the coils establishing magnetic loops extending through the rotating object for monitoring the magnitude of magnetostriction caused by torsional deformation caused in the rotating object due to the rotational torque, each coil producing output signals representative of the monitored magnetostriction magnitude, including a temperature dependent noise component;

means for removing the noise components contained in respective output signals of the electromagnetic coils;

means for deriving rotational torque applied to the rotating body on the basis of the output signals from which the noise components are removed and producing a rotational torque indicative signal.

The magnetostriction type torque sensor system may further comprise a magnetic shield magnetically shielding at least one of the coils.

Preferably, the magnetostriction type torque sensor system comprises two magnetic anisotropy sections formed on the rotating object, four electromagnetic coils, two of which oppose the magnetic anisotropy sections and the remaining two oppose general sections where no magnetic anisotropy is provided, and a bridge circuit including the four coils. In the alternative, the system comprises four magnetic anisotropy sections formed on the rotating object, four electromagnetic coils respectively opposing the magnetic anisotropy sections, and a bridge circuit including the four coils. In either case, the coils are arranged in the bridge for removing the temperature dependent components of the output signals of the coils.

In the preferred construction, the four coils are aligned in axial alignment, two of the four coils are oriented relative to both ends of the aligned coils to have a given impedance relative to that of the remaining two coils which are oriented between the former two coils, the given impedance being determined at a ratio relative to the impedance of the latter two coils, corresponding to the ratio of the distance between the latter two coils versus the distance between the former two coils. The means for removing the temperature dependent noise component comprises a temperature gradient in the rotating object for deriving a correction value for removing the noise component.

According to another aspect of the invention, a magnetostriction type torque sensor for monitoring rotational torque exerted on an objective rotary body, comprises:

a first section formed on the rotary body, which has the property of magnetic anisotropy;

a second section formed on the rotary body and oriented at a position distanced from the first section at a first known distance;

a third section formed on the rotary body and oriented at a position distanced from the first section at a second known distance;

a first electromagnetic coil disposed in the vicinity of the first section for generating a first magnetic field and producing a first signal having a first value which is variable depending upon the magnitude of the magnetostriction caused by rotational torque exerted on the rotary body, the first value including a first torque dependent component and a first temperature dependent component;

a second electromagnetic coil disposed in the vicinity of the second section for generating a second magnetic field and producing a second signal having a second value which is variable depending upon the magnitude of magnetostriction caused by rotational torque exerted on the rotary body, the second value including a second torque dependent component and a second temperature dependent component;

a third electromagnetic coil disposed in the vicinity of the third section for generating a third magnetic field and producing a third signal having a third value which is variable depending upon the magnitude of magnetostriction caused by rotational torque exerted on the rotary body, the third value including a third torque dependent component and a third temperature dependent component; and a sensor circuit receiving the first, second and third signals and processing the received first, second and third signals for removing the first, second and third temperature dependent components and for deriving an applied torque indicative signal on the basis of the first, second and third signals from which the temperature dependent components are removed.

The first, second and third sections are oriented with known axial intervals relative to adjacent sections. At least one of the first, second and third electromagnetic coils may be magnetically shielded from the adjacent coil.

The magnetostriction type torque sensor system may further comprise a switching assembly disposed in a power supply circuit connecting respective ones of the first, second and third coils so as to selectively establish and break a power supply circuit. The switching assembly is connected to a switching control means which controls the power supply timing for respective first, second and third electromagnetic coils in such a way that the mutual interference of magnetic fields formed by adjacent coils can be canceled. The switching assembly has two switching elements connected in series with respective ones of the first, second and third coils with respect to a power source, the respective ones of the first, second and third coils being oriented at both axial sides of the remaining coil which is constantly connected to the power source.

Alternatively, the sensor circuit comprises a circuit for deriving a temperature gradient on the basis of the difference of the first, second and third signals and deriving the magnitude of the temperature dependent component on the basis of the derived temperature gradient and known distances between the first, second and third coils, and a circuit for removing the derived first, second and third temperature dependent components from the first, second and third signals. The circuit for deriving a temperature gradient comprises a pair of comparators respectively connected to different pairs of first, second and third coils for deriving the difference between input signals from associated pairs of coils, which difference is variable depending upon the temperature gradient in the rotating object. The temperature dependent component removing circuit comprises a coefficient circuit which generates a coefficient for compensating for the temperature dependent components.

In the alternative embodiment, the sensor circuit includes a bridge circuit including the coils, the coils being so arranged in the bridge circuit as to cancel the first, second and third temperature dependent components.

BRIEF DESCRIPTION OF THE DRAWINGS

The present invention will be understood more fully from the detailed description given herebelow and from the accompanying drawings of the preferred embodiments of the invention, which, however, should not be taken to limit the invention to the specific embodiments but are for explanation and understanding only.

In the drawings:

FIG. 13 is a sectional illustration of the second embodiment of the magnetostriction type torque sensor according to the invention;

FIG. 14 is a sectional illustration showing a modification of the second embodiment of the magnetostriction type torque sensor system of FIG. 13;

FIG. 15 is a sectional illustration showing another modification of the second embodiment of the magnetostriction type torque sensor system of FIG. 13;

FIG. 16 is an illustration showing the relationship between the objective rotary shaft in which magnetic anisotropy sections are formed, and the torque detector coils arranged according to a modified layout in the third embodiment of the magnetostriction type torque sensor according to the invention;

FIG. 17 is a circuit diagram of a sensor circuit employed in the magnetostriction type torque sensor system of FIG. 16;

FIG. 18 is a circuit diagram of a modified embodiment of the sensor circuit of FIG. 17;

FIG. 19 shows a graph showing temperature distribution in the rotary shaft in FIG. 16;

FIG. 20 is a graph showing relationship between temperature difference and drift in the embodiment of FIGS. 16 and 17, and that in the conventional art;

FIG. 24 is an illustration of the fourth embodiment of a magnetostriction type torque sensor system according to the present invention;

DETAILED DESCRIPTION OF THE PREFERRED EMBODIMENTS

Figure 1:
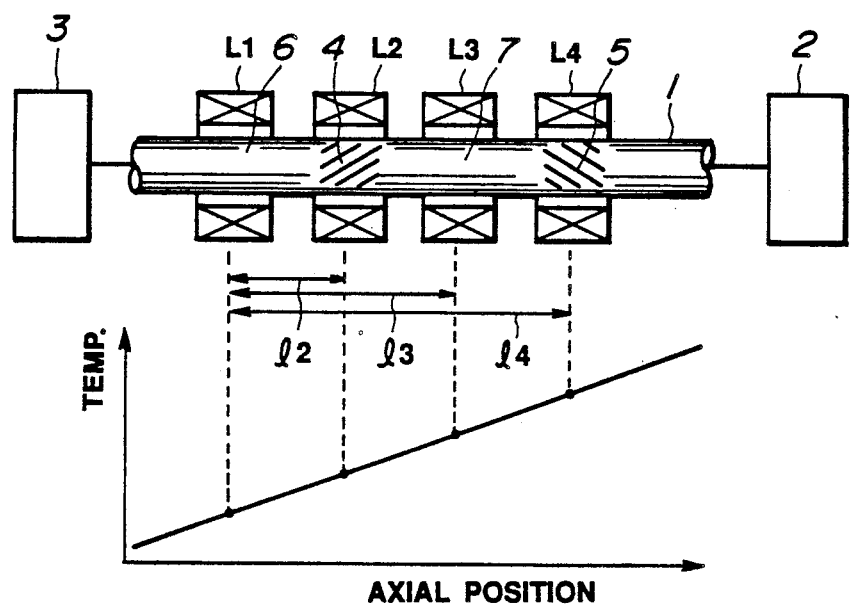
FIG. 1 is an illustration showing generally the relationship of an objective rotary shaft as a rotating body and a plurality of torque detector coils in the first embodiment of a magnetostriction type torque sensor system according to the present invention.

Referring now to the drawings, particularly to FIG. 1, the first embodiment of a magnetostriction type torque sensor system, according to the present invention, is designed for monitoring rotating torque applied on a rotary shaft 1 as an objective rotary body about which the rotational torque applied is monitored. The rotary shaft 1 is formed of a magnetic substance having a magnetostrictive property.

It should be appreciated that, as set forth, the rotary shaft to monitor the applied torque, can be a rotary shaft employed in an automotive power train, a rotary element in a machine tool, a shaft, bar or the like, a test piece for testing the manufactured shaft, bar or the like as a product, or any other rotating object of bar-shaped, shaft-shaped or other configurations suitable for rotating.

In the example shown in FIG. 1, the rotary shaft 1 is connected at one end to a rotary power source 2, such as an automotive engine, an electric motor or so forth. The other end of the rotary shaft 1 is connected to a load 3 for rotatingly driving the latter. Namely, the rotary shaft 1 is designed to be driven by the driving torque input from the rotary power source 2 and thus rotates to transmit the driving torque to the load 3. The rotary shaft 1 has magnetic anisotropy sections 4 and 5. Section 4 is provided with left-hand spiral magnetic anisotropy. On the other hand, section 5 is provided with right-hand spiral magnetic anisotropy. The magnetic anisotropy sections 4 and 5 have the property of varying magnetic permeability in response to rotary torque applied to the rotary shaft at a greater magnitude than that of the remaining sections.

The skew angle of the magnetic anisotropy with respect of the axis of the rotary shaft 1 is preferred to be 45°. However, the skew angle should not be limited to the preferred angle but can be varied within a suitable range around the most preferred skew angle.

Anisotropy is provided for the rotary shaft 1 by attaching amorphous thin strips or ribbon, forming skewed grooves with spiral projections by machining, local rapid heating and rapid cooling by means of a plasma or a laser beam, cementation, nitriding treatment or any other appropriate ways.

Opposing the rotary shaft 1, are a plurality of torque detector coils L1, L2, L3 and L4. Respective coils L1, L2, L3 and L4 are connected to an electric power source to be excited by power supplied from the power source to establish flux loops extending through the rotary shaft 1. In the embodiment of FIG. 1, the coils L1, L2, L3 and L4 are respectively formed into annular ring shaped configurations to surround the periphery of the rotary shaft 1. The coils L1, L2, L3 and L4 are arranged in axial arrangement by placing their axes coaxially with the axis of the rotary shaft 1. With this construction, the fluxes formed for respective detector coils L1, L2, L3 and L4 pass the axis of the rotary shaft 1.

Among these coils, the coils L2 and L4 are oriented in opposition to the anisotropy sections 4 and 5. The coils L1 and L3 are oriented at positions 6 and 7 in the vicinity of the anisotropy sections but where anisotropy is not provided. As will be seen from FIG. 1, the distances between respective ones of adjacent coils L1, L2, L3 and L4 are so determined that the temperature differences are equal to each other. In FIG. 1, the distances between the coils L1 and L2, the coils L2 and L3 and the coils L3 and L4 can be relatively long when the temperature gradient in the rotary shaft 1 is linear. On the other hand, when the temperature gradient is not linear, the respective distances have to be minimized.

Figure 2:
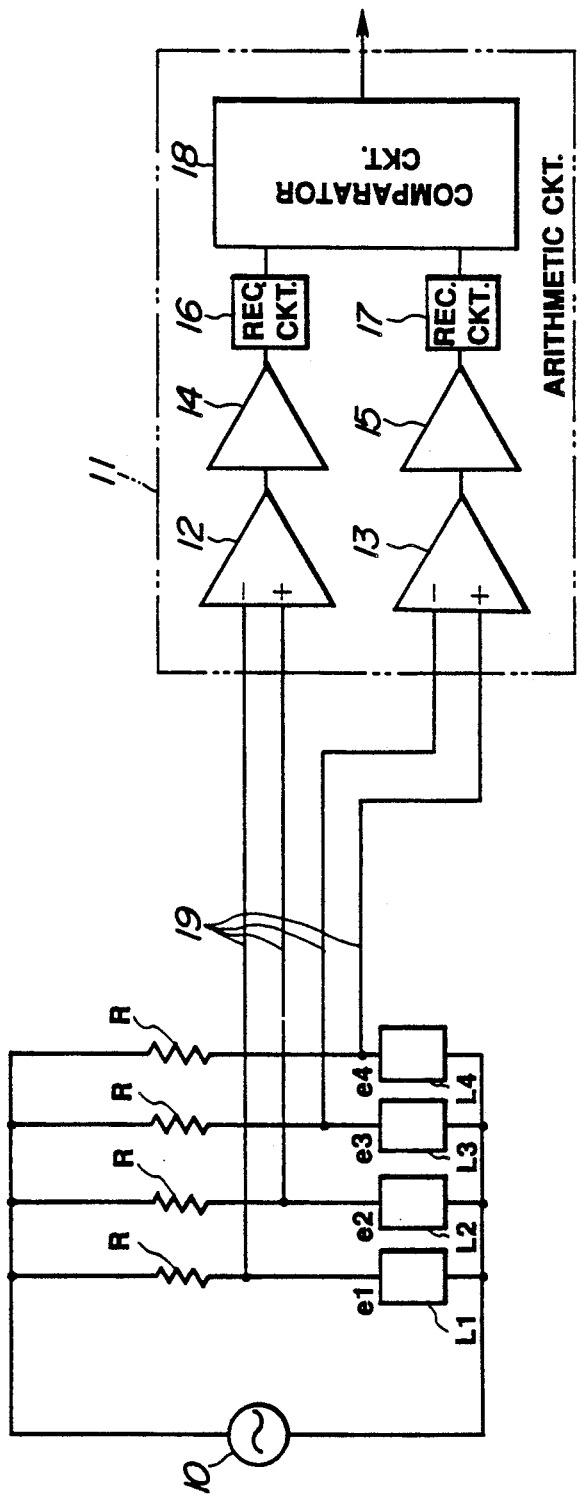
FIG. 2 is a circuit diagram of the first embodiment of the magnetostriction type torque sensor system of FIG. 1.

FIG. 2 shows a torque sensor circuit. As seen, respective torque detector coils L1, L2, L3 and L4 are connected to an alternating current source 10 in series with resistors R. Junctions between the coils L1 and L2 and the resistors R are connected to a comparator circuit 12. On the other hand, junctions between the coils L3 and L4 and the resistors R are connected to a comparator circuit 13. These comparator circuits 12 and 13 comprise differential amplifiers. The outputs of the comparator circuits 12 and 13 are respectively connected to level adjusting circuits 14 and 15 having predetermined gain for causing a level shift of the outputs of respectively associated comparator circuits 12 and 13. The level adjusting circuits 14 and 15 are connected to rectifier circuits 16 and 17 which are designed for converting alternating current signals fed from the level adjusting circuits 14 and 15 into direct current signals. The rectified signals are then input to the comparator circuit 18. The comparator circuit 18 derives the difference between the input rectified signals. For this purpose, the comparator circuit 18 may comprise a differential amplifier which serves as a subtractor circuit. The difference indicative output of the comparator circuit 18 serves as an applied torque indicative signal.

It should be noted that when the connection of the coils L3 and L4 to the comparator circuit 13 is reversed, the comparator circuit 18 may serve as adder for adding the rectifid inputs to derive the applied torque indicative signal.

In the construction set forth above, the torque detector coils L1, L2, L3 and L4 are excited by the power supply from the alternating power source 10. Then flux loops extending through the rotary shaft 1 are formed. The magnetic permeability of the rotary shaft is variable depending upon the magnitude of twisting deformation caused therein. Namely, when rotational torque is applied to the rotary shaft, twisting deformation is caused in the rotary shaft, the magnitude of which is variable depending upon the magnitude of the rotational torque applied. Therefore, the magnetic permeability reflects the rotational torque applied. In addition, the magnetic permeability is further variable depending upon the temperature of the rotary shaft. The temperature dependent variation component of the magnetic permeability thus serves as a noise component for monitoring the rotational torque exerted on the rotary shaft 1. Depending upon the magnetic permeability of respectively associated sections 6, 4, 7 and 5, the torque detector coils L1, L2, L3 and L4 produce output signals. The output signals of the torque detector coils L1 and L2 have voltages $e_1$ and $e_2$ variable depending upon the magnetic permeability of the sections 6 and 4. These two voltage signals $e_1$ and $e_2$ are input to the comparator circuit 12. Similarly, the coils L3 and L4 output signals having voltages $e_3$ and $e_4$ variable depending upon the magnetic permeability of the associated sections 7 and 5. The output signals $e_3$ and $e_4$ are fed to the comparator circuit 13. The comparator signals of the comparator circuits 12 and 13 are fed to the comparator circuit 18 via respectively associated level adjusting circuits 14 and 15 and the rectifier circuits 16 and 17. Based on the two inputs thus inputted, the comparator circuit 18 derives the applied torque dependent signal.

Figure 3:
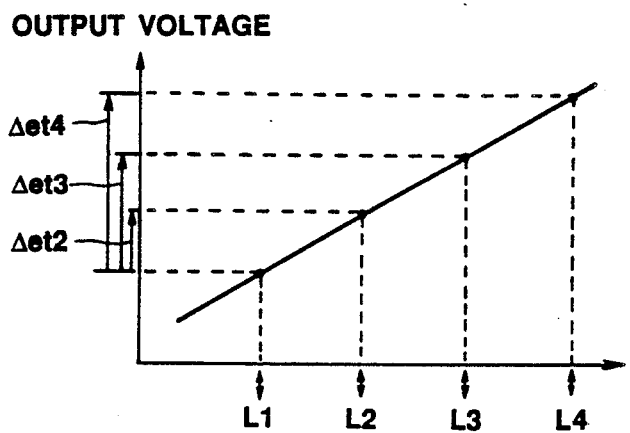
FIG. 3 is a graph showing the relationship between temperature and output voltage of the torque detector coil.

Further details of the operation of the arithmetic circuit 11 will now be discussed. The rotary shaft 1 has a temperature gradient with temperature distribution to vary temperature at various positions. For example, the rotary shaft 1 1. The relationship between the positions of the coils L1, L2, L3 and L4 and the voltage differences $\Delta e t_2$, $\Delta e t_3$ and $\Delta e t_4$ of the output voltages $e_2$, $e_3$ and $e_4$ of the coils L2, L3, and L4 and the output voltage $e_1$ of the coil L1 are shown in FIG. 3. Assuming no rotational torque is applied to the rotary shaft 1, the voltage differences $\Delta e t_2$, $\Delta e t_3$ and $\Delta e t_4$ simply depend upon the temperature difference. Further assuming the output voltage of the coil L1 being $e_0$, and the output voltage variations in the coils L1, L2, L3 and L4 when the torque is applied, are $+T_1$, $+T_2$, $+T_3$ and $+T_4$, the output voltages $e_1$, $e_2$, $e_3$ and $e_4$ can be described by:

$$e_1 = e_0 + T_1$$

$$e_2 = e_0 + \Delta e t_2 + T_2$$

$$e_3 = e_0 + \Delta e t_3 + T_3$$

$$e_4 = e_0 + \Delta e t_4 + T_4$$

The distances to the coils L2, L3 and L4 from the coil L1 are respectively $X_2$ $X_3$ and $X_4$. Since the temperature gradient in the example of FIG. 1 is linear, the following relationship can be described:

$$\Delta e t_2 / \chi_2 = \Delta e t_3 / \chi_3 = \Delta e t_4 / \chi_4$$

$$\Delta et_3 = \Delta et_2 \times \chi_3/\chi_2$$

$$\Delta et_4 = \Delta et_2 \times \chi_4/\chi_2$$

By subtracting $e_1$ from $e_2$ by utilizing the comparator circuit 12, the following equation can be established:

$$e_2 - e_1 = \Delta et_2 + (T_2 - T_1) \quad (1)$$

On the other hand, by subtracting $e_3$ from $e_4$ by means of the comparator circuit 13, the following equation can be established:

$$e_4 - e_3 \, \Delta et_2(\chi_4 - \chi_3)/\chi_2 + (T_4 - T_3) \quad (2)$$

From the foregoing equations (1) and (2), $\Delta et_2$ is removed to establish the following equation:

$$(\chi_4-\chi_3)(e_2-e_1)-\chi_2(e_4-e_3) = (\chi_4-\chi_3)(T_2-T_1)-\chi_2(T_4-T_3) \quad (3)$$

Here, assuming $\chi_4 - \chi_3 = k_1$, $\chi_2 = k_2$, the equation (3) can be modified to:

$$k_1(e_2-e_1) - k_2(e_4-e_3) = k_1(T_2-T_1) - k_2(T_4-T_3) \quad (4)$$

where $(k_1 = \chi_4 - \chi_3, k_2 = \chi_2)$

As will be appreciated herefrom, in the embodiment shown, the four coils L1, L2, L3 and L4 serve not only for monitoring the torque applied to the associated sections 6, 4, 7 and 5 of the rotary shaft 1, but also for compensating for temperature gradient dependent error.

In the embodiment shown, $k_1$ and $k_2$ can be set as the gains of the level adjusting circuits 14 and 15. In practice, the values of $k_1$ and $k_2$ are set depending upon the distance between coils L1, L2, L3 and L4. The right side segment of the equation (4) is an arithmetic operation done by the comparator circuit 18. As will be seen from the right side segment, the temperature gradient dependent error can be eliminated. Therefore, the output of the first embodiment of the magnetostriction type torque sensor, according to the present invention, can represent magnetic permeability purely depending upon the magnetostriction caused by application of the rotational torque.

In the first embodiment of the torque sensor system of FIG. 1, the coils L1 and L3 are provided at the sections where no magnetic anisotropy is provided. Therefore, the coils L1 and L3 are provided simply for temperature gradient dependent error compensation. Therefore, the applied torque dependent values are $T_1 = 0$, $T_2 = T$, $T_3 = 9$ and $T_4 = -T$. Therefore, assuming $\chi_4 - \chi_3 = \chi_2$, equation (4) can be modified as:

$$(e_2-e_1)-(e_4-e_3)=2T$$

Therefore, the resultant torque sensor system output becomes twice that which can be obtained from a single coil L2.

Figure 4:
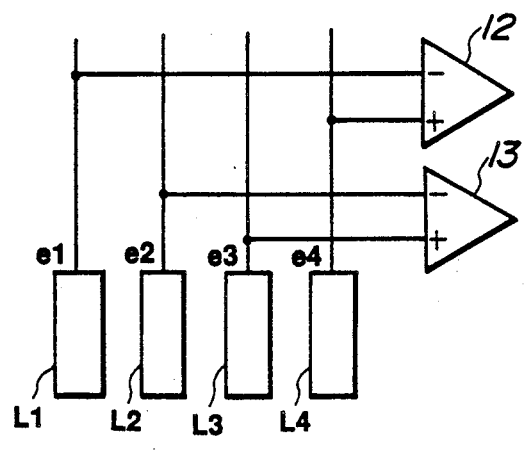
FIGS. 4 and 5 are schematic circuit diagrams showing modified connections between the torque detector coils and comparator circuits.

FIG. 4 shows a modification of the aforementioned first embodiment of the magnetostriction type torque sensor system, according to the present invention. In this modification, the coils L1 and L4 are connected to the comparator circuit 12. As seen from FIG. 4, the coil L1 is connected to the inverting input terminal of the comparator circuit 12 and the coil L4 is connected to the non-inverting input terminal of the comparator circuit. On the other hand, the coils L2 and L3 are connected to the comparator circuit 13. Namely, the coil L2 is connected to the inverting input terminal of the comparator circuit 13 and the coil L3 is connected to the non-inverting input terminal. Therefore, the equation (4) in the former embodiment can be modified as:

$$k_3(e_4-e_1)-k_4(e_3-e_2) = k_3(T_4-T_1)-k_4(T_3-T_2) \quad (5)$$

where $k_3 = \chi_3 - \chi_2$, $k_4 = \chi_4$

Assuming $\chi_3 - \chi_2 = \chi$, $\chi_4 = 3\chi$, the foregoing equation (5) can be modified as:

$$(e_4-e_1)-3(e_3-e_2)=(T_4-T_1)-3(T_3-T_2)$$

or $$(e_4-e_1)/3-(e_3-e_2)=(T_4-T_1)/3=(T_3-T_2)$$

Figure 6:
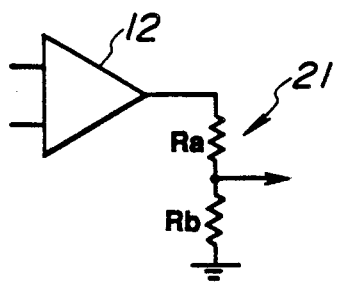
FIG. 6 is a circuit diagram of a modified construction of an output level compensation circuit to be employed in the circuit of the magnetostriction type torque sensor system of FIG. 3.

In the equations set forth above, the coefficient 3 or ⅓ can be set by adjusting the gain of the level adjusting circuits 14 and 15. In an alternative embodiment, a circuit illustrated in FIG. 6 can be used for the level adjusting circuit 14. In the shown circuit construction in FIG. 6, the level adjusting circuit comprises a resistance divider circuit 21 in which a pair of resistors Ra and Rb are provided. The resistance of the resistor Rb is set at half of that of the resistor Ra. When the circuit of FIG. 6 is used, the level adjusting circuit 15 can be neglected or the gain of the level adjusting circuit 15 can be set at one (1).

Figure 5:
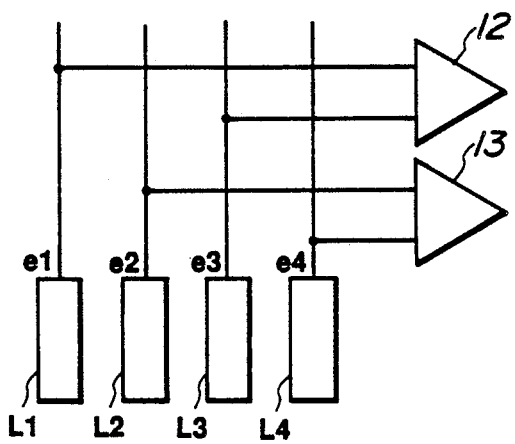

FIG. 5 shows another modification of the foregoing first embodiment of the magnetostriction type torque sensor according to the invention. In this modification, the coils L1 and L3 are connected to the comparator circuit 12. As seen from FIG. 4, the coil L1 is connected to the inverting input terminal of the comparator circuit 12 and the coil L3 is connected to the non-inverting input terminal of the comparator circuit. On the other hand, the coils L2 and L4 are connected to the comparator circuit 13. Namely, the coil L2 is connected to the inverting input terminal of the comparator circuit 13 and the coil L4 is connected to the non-inverting input terminal. Therefore, the equation (4) in the former embodiment can be modified as:

$$k_5(e_3-e_1)-k_6(e_4-e_2) = k_5(T_3-T_1)-k_6(T_4-T_2) \quad (6)$$

where $k_5 = \chi_4 - \chi_2$, $k_6 = \chi_3$

Assuming $\chi_4 - \chi_2 = 2\chi$, $\chi_3 = 2\chi$, the foregoing equation (5) can be modified as:

$$(e_3-e_1)-(e_4-e_2)=(T_3 3 l \, T_1)-(T_4-T_2)$$

As will be seen herefrom, the shown embodiment can successfully eliminate the influence of the temperature gradient.

The possible combination of the directions and number of the magnetic anisotropy sections and arrangements thereof can be eighty ($=3^4-1$). Among the possible eighty combinations, the appended table 1 shows twenty-two examples, for which the derived torque value in the foregoing equations (4), (5) and (6) will be shown. In the appended table pb 1, a skew direction the same as that in the anisotropy section 4 will be indicated by the sign (+) and a skew direction the same as that in the anisotropy section 5 will be indicated by the sign (−). Furthermore, in all of the twenty-two examples, the coils are arranged at equal intervals.

Figure 7:
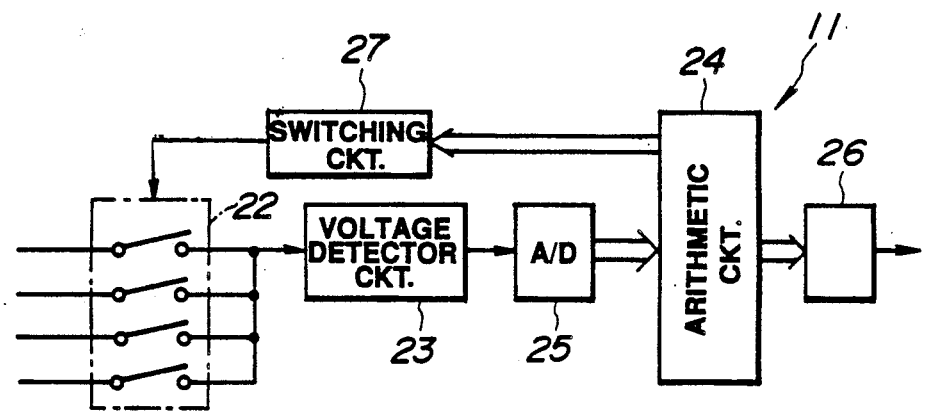
FIG. 7 is a block diagram of a modification of an arithmetic circuit to be employed in the circuit of the magnetostriction type torque sensor system of FIG. 3.

FIG. 7 shows a modification of the arithmetic circuit which can be employed in the first embodiment of the magnetostriction type torque sensor according to the invention. In FIG. 7, the arithmetic circuit includes a switch assembly 22, such as an analog switch. The switch assembly 22 comprises four switch elements respectively connected to the torque detector coils L1, L2, L3 and L4. The switch assembly 22 is, in turn, connected to a voltage detecting circuit 23. The voltage detecting circuit 23 may comprise a synchronous rectifier. The voltage detector circuit 23 inputs the output to an arithmetic circuit 24 which comprises a digital processor, via an analog-to-digital (A/D) converter 25. The arithmetic circuit 24 is further connected to a switching circuit 27 which is connected to the switch assembly 22 for performing switching operations. The switching circuit 27 selectively turns the switch elements ON in order. The switching assembly 22 as controlled by the switching circuit 27 thus performs a multiplexing operation for selectively inputting the output of the coils L1, L2, L3 and L4 in order.

The arithmetic circuit 24 includes a memory unit for temporarily storing data. The arithmetic circuit 24 controls the reading timing of the magnetostriction magnitude indicative data from respective coils L1, L2, L3 and L4. The arithmetic circuit 24 operates to derive the applied torque indicative data on the basis of the stored data in the memory unit, which represents monitored magnetostriction magnitude indicative data input from the coils L1, L2, L3 and L4.

As set forth, the output voltages $e_1$, $e_2$, $e_3$ and $e_4$ of the torque detector coils L1, L2, L3 and L4 can be derived based on the initial output voltage $e_0$, the temperature gradient dependent components $\Delta et_2$, $\Delta et_3$ and $\Delta et_4$, and the rotational torque dependent components $T_1$, $T_2$, $T_3$ and $T_4$. As will be appreciated, the temperature gradient dependent components $\Delta et_2$, $\Delta et_3$ and $\Delta et_4$ serve as noise components in measurement of the applied torque.

Figure 8:
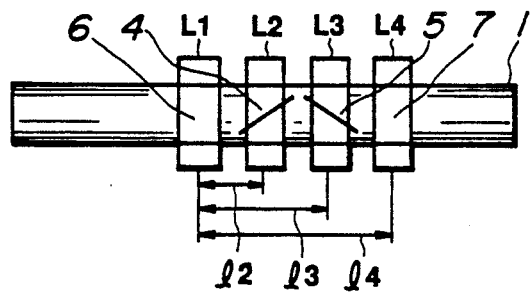
FIGS. 8 and 9 are fragmentary illustrations showing variations of arrangements of magnetic anisotropy sections and the torque detector coils.

The arithmetic circuit 24 at first derives temperature gradient data $\Delta et$ representative of temperature variation in the rotary shaft 1 in a unit length. This arithmetic operation serves as a replacement for the temperature gradient dependent error compensation coils. In order to derive temperature gradient data $\Delta et$, the magnetostriction magnitude indicative data of the coils of the sections of the rotary shaft 1 where the magnetic anisotropy is not provided, or of the coils of the section where the same direction of anisotropy is provided is used. One example of the magnetic anisotropy sections, the sections where the magnetic anisotropy is not formed, and the coils L1, L2, L3 and L4 is shown in FIG. 8. In the example of FIG. 8, the temperature gradient $\Delta et$ is determined on the basis of the output voltages $e_1$ and $e_4$ of the coils L1 and L4. Namely, $T_1 = T_4 (=0)$ is established in the example of FIG. 8. Therefore, the temperature gradient data $\Delta et$ can be derived by:

$$\Delta et = (e_4 - e_1)/\chi_4 = \Delta et_4/\chi_4$$

The arithmetic circuit 24 derives a correction value for removing the temperature gradient dependent error component from the outputs of the coils L1, L2, L3 and L4. With the correction value, the output voltages $e_2$ and $e_3$ of the torque detector coils L2 and L3 can be corrected according to the following equations:

$$e_2' = e_0 + \Delta et_2 - \Delta et \times \chi_2 + T_3$$

$$e_3' = e_0 + \Delta et_3 - \Delta et \times \chi_3 + T_3$$

where $e_2'$ and $e_3'$ are respectively corrected output voltages of the torque detector coils L2 and L3.

In the arithmetic circuit, a further arithmetic operation is performed for deriving the applied torque data on the basis of the corrected output voltages $e_2'$ and $e_3'$. In practical operation, the applied torque data is derived by subtracting the sum of the output voltages of the coils of the negative polarity anisotropy section 5 from the sum of the output voltages of the coils of the positive polarity anisotropy section 4. In the example shown, the applied torque data is derived by calculating a difference of $e_2'$ and $-e_3'$. The applied torque indicative data is output from the arithmetic circuit 24 in the form of a digital signal. The digital signal is converted into a torque indicative analog signal by means of a digital-to-analog (D/A) converter 26. By this, torque data avoiding the influence of the temperature gradient dependent error can be obtained.

Figure 9:
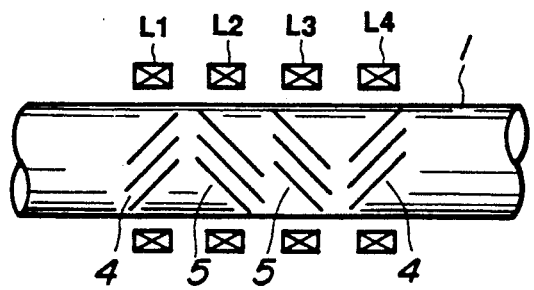

FIG. 9 is another pattern of anisotropy sections and torque detector coils. As seen from FIG. 9, the section 4 opposing the torque detector coils L1 and L4 is provided positive polarity anisotropy and the section 5 opposing the torque detector coils L2 and L3 is provided negative polarity anisotropy. Therefore, the temperature gradient data $\Delta et$ is derived on the basis of the output voltages $e_1$ and $e_4$ of the coils L1 and L4, or, in the alternative, based on the output voltages $e_2$ and $e_3$ of the coils L2 and L3. In this embodiment, all of the torque detector coils L1, L2, L3 and L4 oppose the anisotropy sections 4 and 5.

In the embodiment shown, respective ones of the corrected output voltages $e_2'$, $e_3'$ and $e_4'$ are derived from the following equations:

$$e_2' = e_0 + \Delta et_2 - \Delta et \times \chi_2 + T_2$$

$$e_3' = e_0 + \Delta et_3 - \Delta et \times 102\ _3 + T_2$$

$$e_2' = e_0 + \Delta et_4 - \Delta et \times \chi_4 + T_2$$

From the above, the applied torque data is derived by subtracting the sum $(e_2' + e_3')$ of the torque detector coils L2 and L3 of the negative polarity anisotropy sections from the sum $(e_1' + e_4')$ of the torque detector coils L1 and L4 of the positive polarity anisotropy sections. With this, a temperature gradient dependent error component can be successfully avoided.

Figure 10:
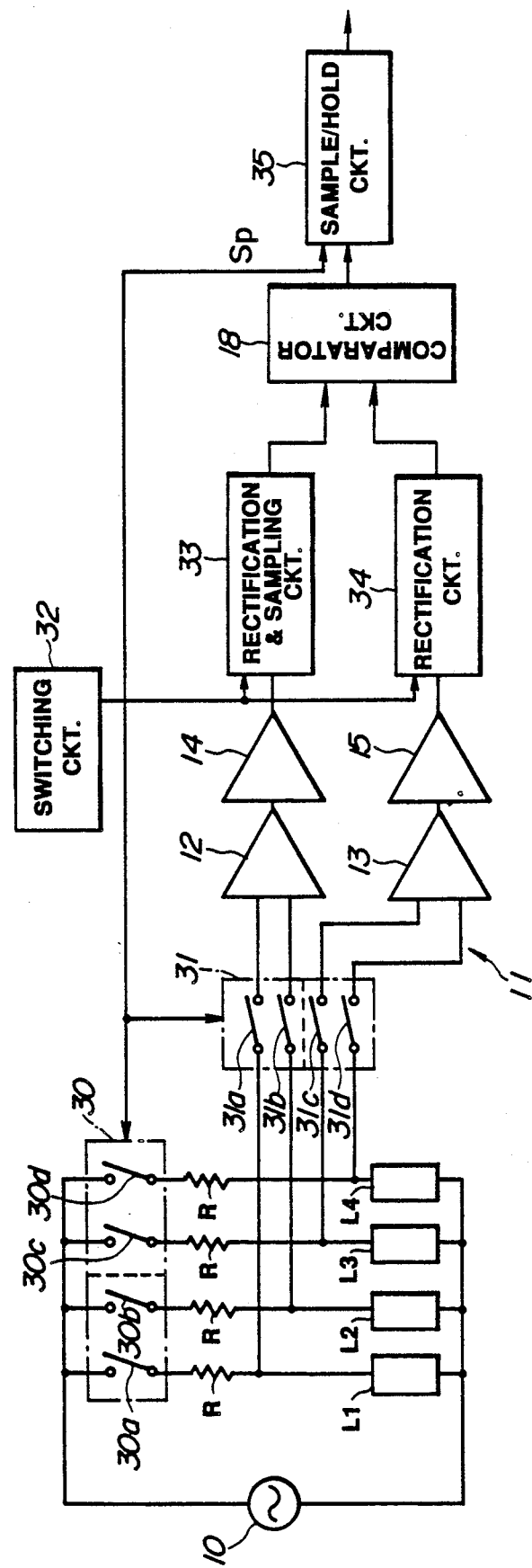
FIG. 10 is a circuit diagram of a modified embodiment of circuitry of the magnetostriction type torque sensor system.

FIG. 10 is a block diagram of a modification of the torque sensor circuit to be employed in the first embodiment of the magnetostriction type torque sensor, according to the present invention. In the embodiment shown, the torque detector coils L1, L2, L3 and L4 are connected to the alternating current source 10 via resistors R and a switch assembly 30. The switch assembly 30 has switching elements 30a, 30b, 30c and 30d. These switching elements 30a, 30b, 30c and 30d are separated into two groups. Namely, the switching elements 30a and 30b form one group designed to be turned ON and OFF simultaneously. Similarly, the switching elements 30c and 30d form another group to be turned ON and OFF simultaneously. On the other hand, the coils L1, L2, L3 and L4 are respectively connected to one of the comparator circuits 12 and 13 via a switch assembly 31. The switch assembly 31 has switching elements 31a, 31b, 31c and 31d. These switching elements 31a, 31b, 31c and 31d are separated into two groups. Namely, the switching elements 31a and 31b form one group designed to be turned ON and OFF simultaneously. Similarly, the switching elements 31c and 31d form another group to be turned ON and OFF simultaneously. The former group of the switching elements 31a and 31b connect the coils L1 and L2 to the comparator circuit 12 while they are held ON. Similarly, the switching elements 31c and 31d connect the coils L3 and L4 to the comparator circuit 13 while they are held ON.

In order to control switch positions of the switching elements 30a, 30b, 30c and 30d of the switch assembly 30 and the switching elements 31a, 31b, 31c and 31d of the switch assembly 31, a switching circuit 32 is provided. The switching circuit 31 produces a timing signal for reversing switch positions of the associated switching elements 30a, 30b, 30c, 30d and 31a, 31b, 31c, 31d at a given timing.

The arithmetic circuit 11 includes a rectification and sampling circuit 33, a rectification circuit 34 and a sample/hold circuit 35. The components of the arithmetic circuit 11 are also connected to the switching circuit 32 to be controlled for operation timing by the timing signal. Therefore, the operation timing of the rectification and sampling circuit 33, the rectification circuit 34 and the sample/hold circuit 35 are synchronized with switching timing of the switching elements 30a, 30b, 30c, 30d and 31a, 31b, 31c, 31d of the switch assemblies 30 and 31. As seen from FIG. 10, the rectification and sampling circuit 33 and the rectification circuit 34 are connected to the comparator circuit 18.

Figure 11:
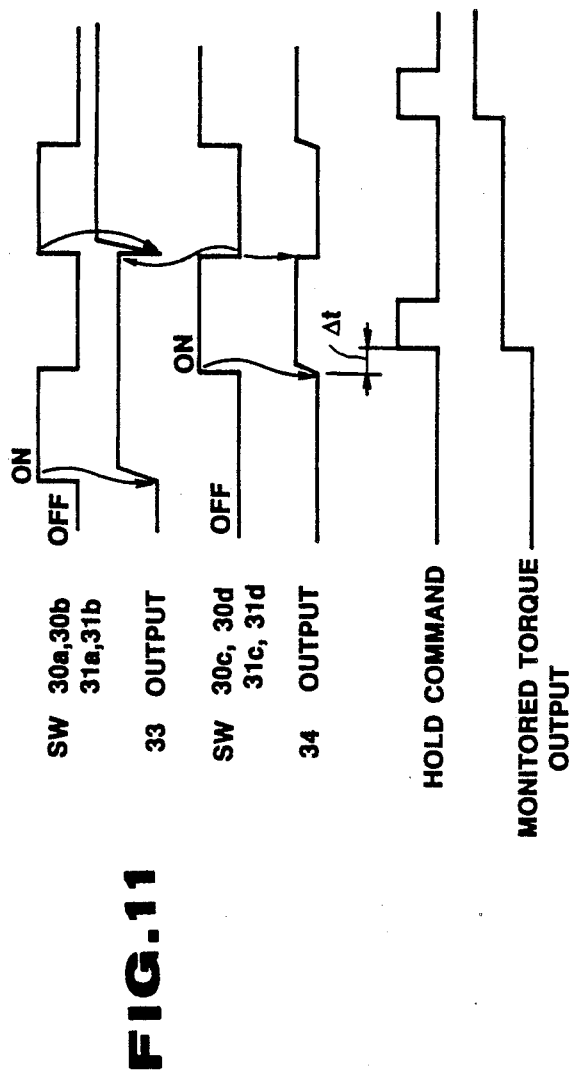
FIG. 11 is a timing chart showing operation of the torque sensor circuit of FIG. 10.

Operation implemented by the circuit shown in FIG. 10 will be discussed herebelow with reference to the timing chart of FIG. 11. At first, the timing signal of the switching circuit 32 is fed to the switching elements 30a and 30b of the switch assembly 30 and the switching elements 31a and 31b of the switch assembly 31. By this, the switching elements 30a, 30b and 31a and 31b are turned ON. Therefore, a closed circuit through the coils L1 and L2 is established to excite the latter. Therefore, magnetic fields are formed around the coils L1 and L2 with flux loops extending through the objective rotary shaft 1. The output signals of the coils L1 and L2 are fed to the comparator circuit 12 via the switching elements 31a and 31b held in a closed position. At this time, as will be normally appreciated, the switching elements 30c and 30d of the switching assembly 30 and the switching elements 31c and 31d are held open. Therefore, the coils L3 and L4 are held in an inactive position.

As set forth, the output signals of the coils L1 and L2 respectively contain an initial voltage level $e_0$, temperature gradient dependent error component $\Delta et_1$ (which is in fact zero) and $\Delta et_2$ and the applied torque dependent components $T_1$ and $T_2$. The output signal $e_1$ of the coil L1 is input to the comparator circuit 12 via the inverting input terminal and the output signal $e_2$ of the coil L2 is input via the non-inverting input terminal. The comparator circuit 12 outputs a comparator signal representative of the difference $(e_2 - e_1)$ of the output signals of the coils L1 and L2. The comparator signal is then adjusted as to the signal level by the signal level adjusting circuit 14 and input to the rectification and sampling circuit 33. At this time, the rectification and sampling circuit 33 is triggered by the timing signal of the switching circuit 32 so as to rectify and latch the input comparator signal. Then, the switching circuit 32 feeds another timing signal to the switch assemblies 30 and 31 to reverse the switch positions. In response to this, the switch positions of the switching elements 30a, 30b, 30c, 30d and 31a, 31b, 31c, 31d are reversed. Therefore, break the power supply for the coils L1 and L2 and the switching elements 30c and 30d are turned ON to establish a power supply circuit for the coils L3 and L4. By this, the coils L3 and L4 are excited to establish magnetic fields around the associated sections of the rotary shaft 1. Simultaneously, the switching elements 31a and 31b are turned OFF to disconnect the coils L1 and L2 from the comparator circuit 12 and the switching elements 31c and 31d are turned ON to establish connection between the coils L3 and L4 and the comparator circuit 13. Coil L3 feeds output signal $e_3$ to the inverting input terminal of the comparator circuit 13. On the other hand, coil L4 feeds the output signal $e_4$ to the non-inverting input terminal of the comparator circuit 13.

The comparator circuit 13 derives the difference $(e_4 - e_3)$ of the outputs of the coils L3 and L4 to output the comparator signal indicative thereof. The comparator signal of the comparator circuit 13 is fed via the level adjusting circuit 15 to the rectification circuit 34. The rectification circuit 34 is triggered by the timing signal which turns ON the switching elements 30c, 30d and 31c and 31d, to rectify the comparator signal from the comparator circuit 13. The rectification circuit 34 then feeds the rectified comparator signal to the comparator circuit 18. Simultaneously, the rectification and sampling circuit 33 is triggered to feed the sampled comparator signal of the comparator circuit 12 to the comparator circuit 18. The comparator circuit 18 then operates to derive the difference of the comparator signals to output the applied torque indicative comparator signal. The comparator signal of the comparator circuit 18 is fed to the sample/hold circuit 35. The sample/hold circuit 35 normally operates in a sampling mode and is responsive to the hold command timing signal of the switching circuit 32, which is generated with a lag time $\Delta t$ after the timing signal turning the switching elements 30c, 30d and 31c and 31d ON.

With the circuit construction an operation set forth above, the accuracy of measurement of the applied torque can be further improved because by triggering adjacent two coils L1, L2 and L3, L4 alternatively mutual interference of the magnetic fields becomes even at respective coils. This is advantageous for cancellation of the interfering component.

Figure 12:
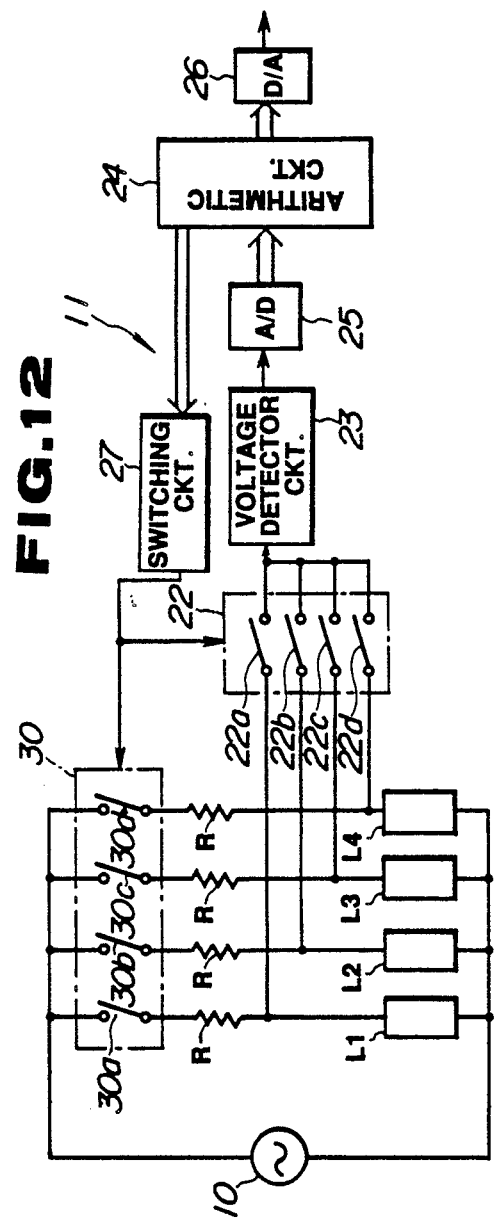
FIG. 12 is a circuit diagram of a modified embodiment of a circuit of the magnetostriction type torque sensor system.

FIG. 12 shows a further modification of the torque sensor circuit to be employed in the first embodiment of the magnetostriction type torque sensor system according to the invention. Similarly to the former embodiment of FIG. 10, this embodiment employs switch assembly 30 for selectively exciting the coils L1, L2, L3 and L4. In place of the switch assembly 31 in the former embodiment, the switch assembly 22 with switching elements 22a, 22b, 22c and 22d is employed for multiplexing output signals of the coils L1, L2 and L3, L4 in feeding circuit 23. The arithmetic circuit 11 is composed of an identical circuit to that illustrated in FIG. 7. This circuit may exhibit accuracy equivalent to that achieved by the former embodiment with avoidance of the mutual interference of the magnetic fields established about adjacent sections on the rotary shaft.

FIG. 13 shows a structural modification of the first embodiment of the magnetostriction type torque sensor system according to the invention. The embodiment shown is intended to eliminate the influence of the interference of the magnetic fields formed by the adjacent coils. As seen from FIG. 13, pairs of coils L1, L2 and L3, L4 respectively form coil assemblies. Namely, the coils L1 and L2 are mounted on the inner periphery of an annular coil bobbin 38. The outer periphery of the coil bobbin 38 is surrounded by a magnetic shield 36. Similarly, the coils L3 and L4 are mounted on the inner periphery of an annular coil bobbin 38. The outer periphery of the coil bobbin 38 is surrounded by a magnetic shield 37.

The magnetic shields 36 and 37 serve for magnetically isolating the associated pair of coils from the other pair of the coils. Therefore, the influence of the magnetic field is limited to that between the paired two coils. As set forth, since the magnitudes of magnetic interference between the paired coils are even to each other, the interfering component can be canceled.

Furthermore, in the construction shown, the magnetic shields 36 and 37 avoid influence of the environmental magnetic field which can be formed by environmental, mechanical or electrical equipment, such as the bearing, coil support and so forth. In addition, the magnetic shields 36 and 37 can serve as a yoke for passing the magnetic flux H as shown in FIG. 13. This improves sensitivity of the coils.

FIG. 14 shows a modification of the construction shown in FIG. 13. In the construction shown, a common magnetic shield 40 is used in place of the magnetic shields 36 and 37 of the former embodiment. The modification exhibits substantially the same effect for avoiding influence in the measurement of the applied torque caused by interferences of the magnetic fields and for improving sensitivity by providing a magnetic path by the magnetic shield. Further alternative embodiment of FIG. 13 is shown in FIG. 15. In this embodiment, individual coils L1, L2, L3 and L4 are covered by individual magnetic shields 39 which surround only one associated coil.

FIG. 16 shows the second embodiment of the magnetostriction type torque sensor system according to the present invention. In the embodiment shown, the rotary shaft 1 is provided with the positive polarity anisotropy section 4 and the negative polarity anisotropy section 5 in adjacent areas. Opposing these sections 4 and 5, the torque detector coils LA and LB are provided. The section 6 oriented adjacent the positive polarity anisotropy section 4 at the side opposite to that interfacing with the negative polarity anisotropy section 5, opposes a temperature gradient compensation coil LC. Similarly, the section 7 oriented adjacent the negative polarity anisotropy section 5 at the side opposite to that interfacing with the positive polarity anisotropy section 4, opposes a temperature gradient compensation coil LD. When no rotational torque is exerted on the rotary shaft 1, the impedances of the coils LA and LB are equal to each other, and the impedances of the coils LC and LD are equal to each other. At this condition, the impedance of each of the coils LC and LD are so related to the impedance of each coil LA and LB in a specific relationship determined by a distance $a$ between the coils LA and LB and a distance $b$ between the coils LC and LD. Namely, the impedance of each coil LC and LD is set at $a/b$ times that of the impedance of each coil LA and LB.

As seen from FIG. 17, the coils LA and LD are connected in series with respect to the power source 10. Also, the coils LB and LC are connected in series with respect to the power source 10. The series circuits of the coils LA, LD and LB, LC form a bridge circuit 41 together with resistors $R_1$ and $R_2$. The resistance of the resistors $R_1$ and $R_2$ may be set at a value equal to each other. Junctions between the coil LD and the resistor $R_1$ and between the coil LC and the resistor $R_2$ are connected to an arithmetic circuit 42 which may comprise a known phase detector circuit.

Assuming no rotational torque is applied to the rotary shaft, the output level of the phase detector circuit 42 is maintained at zero since the impedances of LA, LD and LB, LC are equal to each other. On the other hand, when the rotational torque as shown by arrow A in FIG. 16 is applied to the rotary shaft 1, the impedance of the coil LA increases. Alternatively, the impedance of the coil LB is decreased. Therefore, the output of the phase detector circuit 42 becomes a positive value and represents the magnitude of the rotational torque applied to the rotary shaft 1. When the rotational torque as shown by arrow B in FIG. 16 is applied to the rotary shaft 1, the impedance of the coil LB increases. Alternatively, the impedance of the coil LA is decreased. Therefore, the output of the phase detector circuit 42 becomes a negative value and represents the magnitude of the rotational torque applied to the rotary shaft 1.

Here, a discussion will be given for the influence of the temperature gradient dependent error in measurement of the applied torque utilizing the second embodiment of the magnetostriction type torque sensor system of FIGS. 16 and 17. The impedance of the torque detector coils LA and LB is Z. The temperature dependence of the impedance Z can be illustrated by, $$Z = Z_0 \times (1 + \alpha t)$$

where $Z_0$ is an impedance at a temperature of 0° C.
$\alpha$ is a temperature coefficient and
$t$ is a temperature (° C.)

Assuming the temperature gradient in the rotary shaft 1 is as illustrated in FIG. 19, the impedances ZA, ZB, ZC and ZD of respective coils LA, LB, LC and LD can be illustrated by the following equations:

$$ZA = ZO\ 1 + \alpha\{t_0 + t_2 \times (b-a)/2b\}$$

$$ZB = ZO\ 1 + \alpha\{t_0 + t_2 \times (a+b)/2b\}$$

$$ZC = (ZO \times a/b) \times (1 + \alpha \times t_0)$$

$$ZD = (ZO \times a/b) \times (1 + \alpha \times (t_0 + t_2))$$

From the above equations, $$ZA + ZD = ZB + ZC$$

Therefore, even when a temperature gradient exists in the rotary shaft 1, it may not destroy the balance of the bridge 41. Therefore, the influence of the temperature gradient dependent error can be successfully avoided. The effect achieved by the embodiment shown can be made clear from FIG. 20, in which is illustrated the drift in the output of the arithmetic circuit 42. As seen from FIG. 20, the drift contained in the output of the arithmetic circuit in the embodiment shown is approximately 15% of that in the conventional system in which the temperature gradient dependent error compensation coils LC and LD are not provided. This demonstrates high accuracy in measurement of the applied torque, achieved by the embodiment shown.

The arithmetic circuit 42 in the embodiment of FIG. 17 can be replaced with an arithmetic circuit 42′ in a modified embodiment of FIG. 18. In this embodiment, the arithmetic circuit 42' comprises a pair of rectifier circuits 51a and 51b and a subtractor circuit 52. The subtractor circuit 52 may comprise a differential amplifier. The rectifier circuit 51a is connected to the junction 41a between the coil LC and the resistor $R_2$. On the other hand, the rectifier 51b is connected to the junction 41b between the coil LD and the resistor $R_1$. This embodiment achieves substantially the equivalent effect as that achieved by the embodiment of FIGS. 16 and 17.

Figure 21:
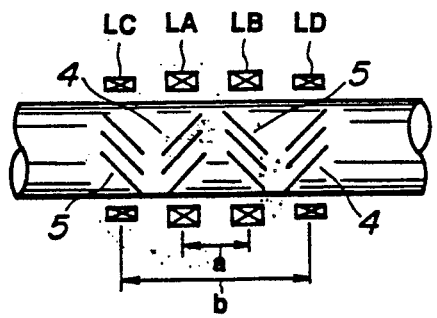
FIG. 21 is an illustration of a modification of the third embodiment of the magnetostriction type torque sensor system of FIG. 16.

FIG. 21 shows a modification. of the foregoing embodiment of FIGS. 16 and 17. In this embodiment, the negative polarity anisotropy sections 5 and the positive polarity anisotropy sections 4 are formed alternatively in the rotary shaft 1. The torque detector coils LC and LB are provided opposing the negative polarity anisotropy sections 5. On the other hand, the torque detector coils LA and LD are provided opposing the positive polarity anisotropy sections 4. With the construction shown, all of the coils LA, LB, LC and LD serve for torque detection and temperature gradient compensation. In this case, the sensitivity of the torque sensor system to the torque applied to the rotary shaft becomes approximately (1+a/b) times that achieved by the embodiment of FIGS. 16 and 17.

Figure 22:
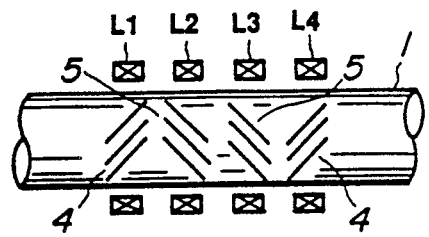
FIG. 22 is an illustration of another modification the third embodiment of the magnetostriction type torque sensor system of FIG. 16.
Figure 23:
FIG. 23 is a graph showing temperature distribution in the objective rotary shaft in the embodiment of FIG. 22.
Figure 24:
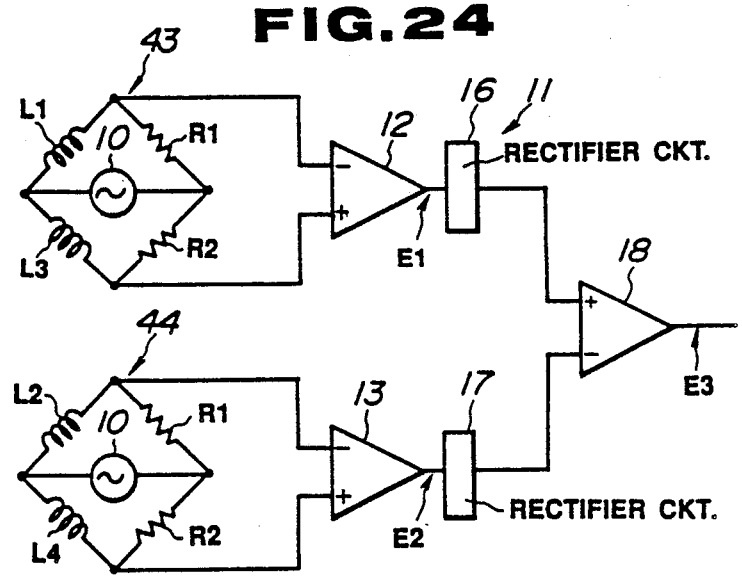
FIG. 24 is a circuit diagram of a sensor circuit in the third embodiment of the magnetostriction type torque sensor system of FIG. 21.

FIGS. 22 to 24 illustrate the third embodiment of the magnetostriction type torque sensor system according to the present invention. Similar to the foregoing embodiment of FIG. 21, the negative polarity anisotropy sections 5 and the positive polarity anisotropy sections 4 are formed alternatively in the rotary shaft 1. The torque detector coils L2 and L4 are provided opposing the negative polarity anisotropy sections 5. On the other hand, the torque detector coils L1 and L3 are provided opposing the positive polarity anisotropy sections 4. With the construction shown, all of the coils L1, L2, L3 and L4 serve for torque detection and temperature gradient compensation.

As seen from FIG. 24, the coils L1 and L3 associated with the positive polarity anisotropy sections 4 form a bridge circuit 43 together with resistors $R_1$ and $R_2$ and the power source 10. Also, the coils L2 and L4 associated with the negative polarity anisotropy sections 5 form a bridge circuit 44 together with resistors $R_1$ and $R_2$ and the power source 10. Therefore, two bridge circuits 43 and 44 are provided in the torque sensor circuit. The junction between the coil L1 and the resistor $R_1$ is comparator circuit 12 and junction between the coil L3 and the resistor $R_2$ is connected to the noninverting input terminal of the comparator circuit 12. Similarly, the junction between the coil L2 and the resistor $R_1$ is connected to the inverting input terminal of the comparator circuit 13 and the junction between the coil L4 and the resistor $R_2$ is connected to the non-inverting input terminal of the comparator circuit 13. With the circuit layout in FIG. 24, the output signals $E_1$ and $E_2$ of the comparator circuits 12 and 13 have opposite polarities with respect to each other, as seen from FIGS. 25(a) and 25(b).

Figures 25A, 25B, 25C:
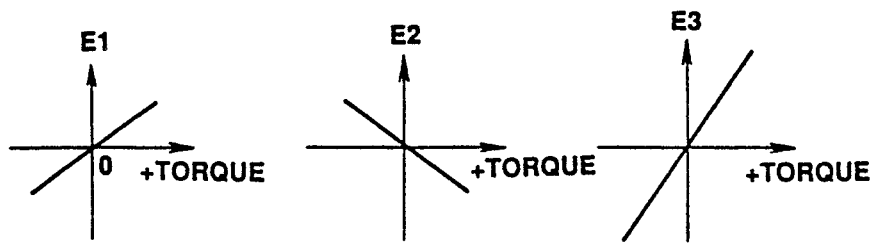
FIGS. 25(a), (b) and (c) are charts showing the relationship between applied torque and outputs of comparators in the circuit of FIG. 24.

The output signals $E_1$ and $E_2$ of the comparator circuits 12 and 13 are fed to the inverting and non-inverting input terminals of the comparator circuit 18 via respectively associated rectifier circuits 16 and 17. Because the polarity of the comparator output signals $E_1$ and $E_2$ input from the comparator circuits 12 and 13 are mutually opposite, the output level of the comparator circuit 18 becomes twice greater than that employing two torque detector coils, as shown in FIG. 25(c).

Here, assuming the rotary shaft 1 has a temperature gradient as shown in FIG. 23, the magnitude of drift contained in the comparator signal $E_1$ of the comparator circuit 12 becomes $2\Delta Zt$. Similarly, the magnitude of drift contained in the comparator signal $E_2$ of the comparator circuit 13 becomes $2\Delta Zt$. These drifts in the comparator signals are canceled in the comparator 18. Therefore, the temperature gradient dependent error in the output signals of the coils L1, L2, L3 and L4 can be successfully removed.

Figure 26:
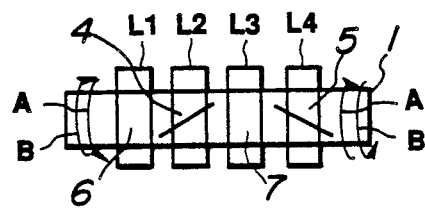
Figure 27:
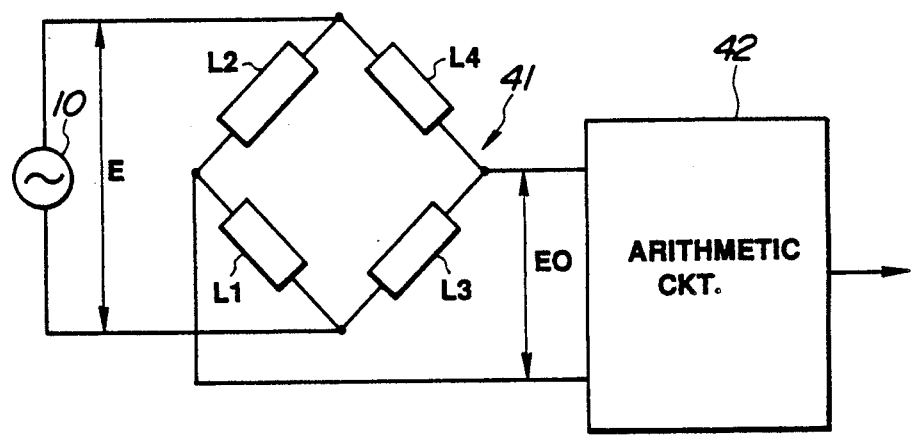
FIG. 27 is a block diagram of the sensor circuit associated with the sensor system of FIG. 26.

FIGS. 26 and 27 show the fourth embodiment of the magnetostriction type torque sensor system according to the invention. In the construction shown, positive polarity and negative polarity anisotropy sections 4 and 5 are formed in the rotary shaft 1. Between the positive polarity and negative polarity anisotropy sections 4 and 5, a section 7 where no anisotropy is provided is oriented. Another section 6 where no anisotropy is provided is oriented on the opposite side of the positive polarity anisotropy section 4. Coils L1, L2, L3 and L4 are provided in opposition to the sections 6, 4, 7 and 5. These coils L1, L2, L3 and L4 form a bridge circuit 41 as shown in FIG. 27. As seen from FIG. 27, the coils L1 and L2 are connected in series with respect to the power source 10.

Also, the coils L3 and L4 are connected in series with respect to the power source 10. In turn, the series circuit of the coils L1 and L2 is parallel to the series circuit of the coils L3 and L4 with respect to the power source 10. On the other hand, the coils L1 and L3 are connected in series with respect to the arithmetic circuit 42. Also, the coils L2 and L4 are connected in series with respect to the arithmetic circuit 42. In turn, the series circuit of the coils L1 and L3 is parallel to the series circuit of the coils L2 and L4 with respect to the arithmetic circuit 42. Junctions between the coils L2 and L1 and between the coils L4 and L3 are connected to the arithmetic circuit 42. The coils L1, L2, L3 and L4 are provided with initial impedance equal to each other when no rotational torque is applied.

Therefore, as long as no rotational torque is applied, the output of the arithmetic circuit 42 is maintained at zero. When the rotational torque in the direction indicated by arrow A is exerted, the output of the arithmetic circuit 42 becomes a positive value. Alternatively, when the rotational torque is in the direction indicated by arrow B in FIG. 26, the output of the arithmetic circuit 42 becomes a negative value.

The temperature gradient dependent characteristics of the fourth embodiment of the magnetostriction type torque sensor system of FIGS. 26 and 27 will be discussed herebelow. Assuming the temperature gradient is linear in the rise of the temperature of sections from the section 6 to section 5 in FIG. 26, the temperature gradient dependent errors contained in the output signals of the coils L2, L3 and L4 respectively become $\Delta Zt$, $2\Delta Zt$ and $3\Delta Zt$. Assuming the power source voltage supplied from the power source 10 is E and the output voltage of the bridge circuit 41 is $E_0$, $E_0$ can be illustrated by:

$$E_0 = E\{Z3/(Z3+Z4) - Z1/(Z1+Z2)\} = E\{(Z2Z3 - Z1Z4)/(Z1+Z2)(Z3+Z4)\} \qquad (7)$$

where Z1, Z2, Z3 and Z4 are output voltages of the coils L1, L2, L3 and L4.

Here, in the equation (7) set forth above, the numerator can be modified by introducing the temperature gradient dependent errors:

$$(Z2+\Delta Zt)(Z3+2\Delta Zt)-Z1(Z4+3\Delta Zt) \quad (8)$$

Since the initial output voltages Z1, Z2, Z3 and Z4 of the coils L1, L2, L3 and L4 are maintained equal to each other, the foregoing equation (8) can be simplified to $2(\Delta Zt)^2$, As will be seen from the equation (7), the value of the denominator of the equation (7) is in the order of Z2. Therefore, as long as $\Delta Zt << Z$ (in which $\Delta Zt$ is normally in a order of one-hundreds to one thousands), the influence of the temperature gradient dependent error for the measured outputs of the coils L1, L2, L3 and L4 becomes substantially small.

Figure 28:
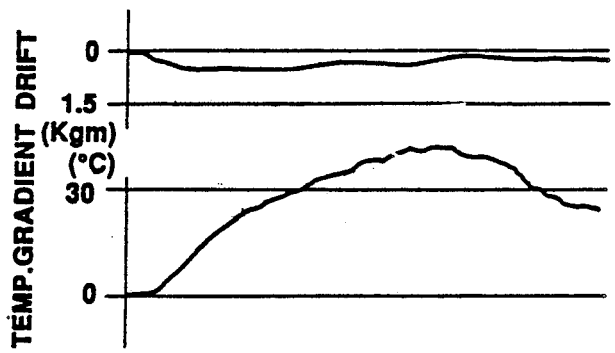
FIG. 28 is a graph showing actually measured data in experiments performed utilizing the magnetostriction torque sensor of FIGS. 25 and 26.
Figure 29:
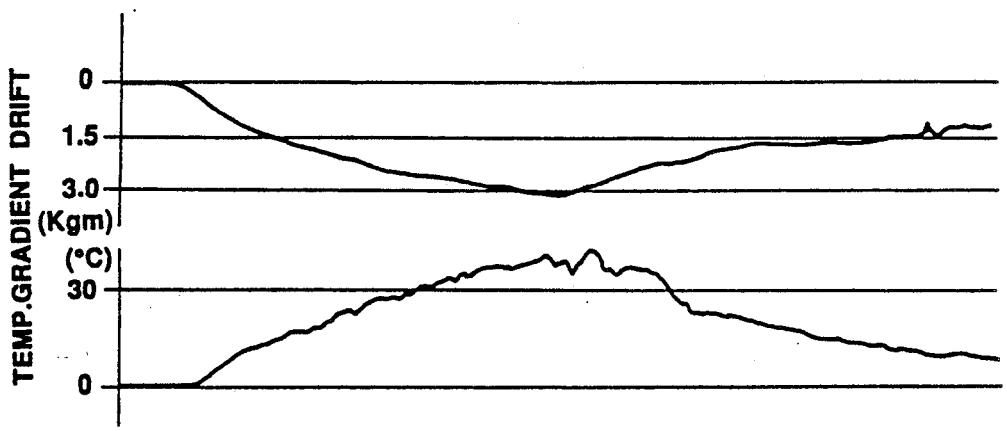
FIG. 29 is a graph showing actually measured data in experiments performed under the same conditions as illustrated in FIG. 27 but utilizing the conventional torque sensor.
Figure 30A:
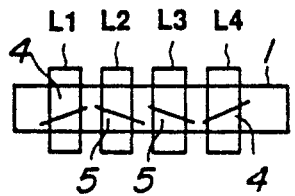
FIGS. 30(a), (b), (c), (d) and (e) are illustrations respectively showing variations of arrangements of the magnetic anisotropy sections and the torque detector coils.
Figure 30D:
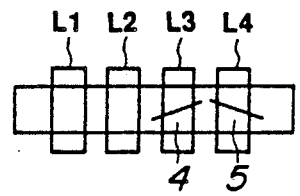
Figure 30B:
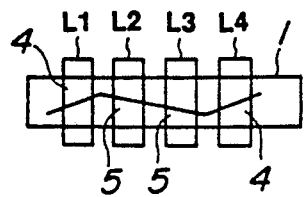
Figure 30C:
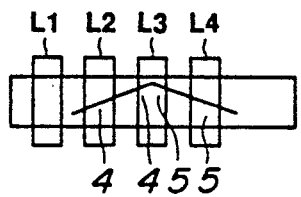
Figure 30E:
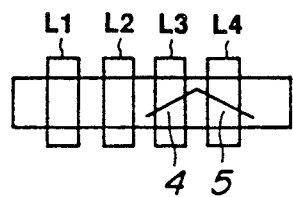

FIG. 28 shows actually measured values of the drift contained in the monitored torque indicative signal and the magnitude of temperature gradient, which are measured in the experiment performed utilizing the fourth embodiment of the magnetostriction type torque sensor system of Figs. 26 and 27. The result shows that at the temperature difference of 55° C., the drift contained in the torque indicative signal was 5.25%. This can be compared with the actually measured drift and temperature gradient in the experiment performed utilizing the conventional magnetostriction type torque sensor system, in which only a pair of torque detector coils are provided. The result is shown in FIG. 29. As seen herefrom, the drift contained at the temperature difference of 55° C. in the prior art was 27.8%. As will be appreciated by comparing FIGS. 28 and 29, substantial reduction of the influence of the temperature gradient dependent error can be achieved by the embodiment of FIGS. 26 and 27.

FIGS. 30(a), 30(b), 30(c), 30(d) and 30(e) show variations of patterns of anisotropy sections to be provided on the rotary shaft for which the rotational torque applied is to be measured. The fourth embodiment of the magnetostriction type torque sensor system, according to the present invention, can be implemented by any of these patterns. It should be noted that these patterns are mere examples given for showing examples of variations and should not be understood to limit the arrangement or patterns of the anisotropy sections to the shown patterns.

Figure 31:
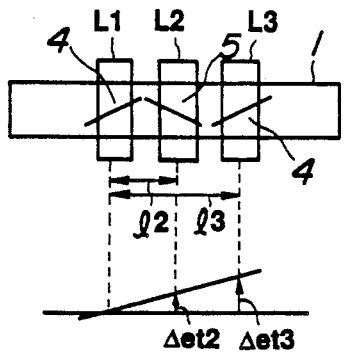
FIG. 31 is an illustration of the fifth embodiment of the magnetostriction type torque sensor system according to the invention.
Figure 32:
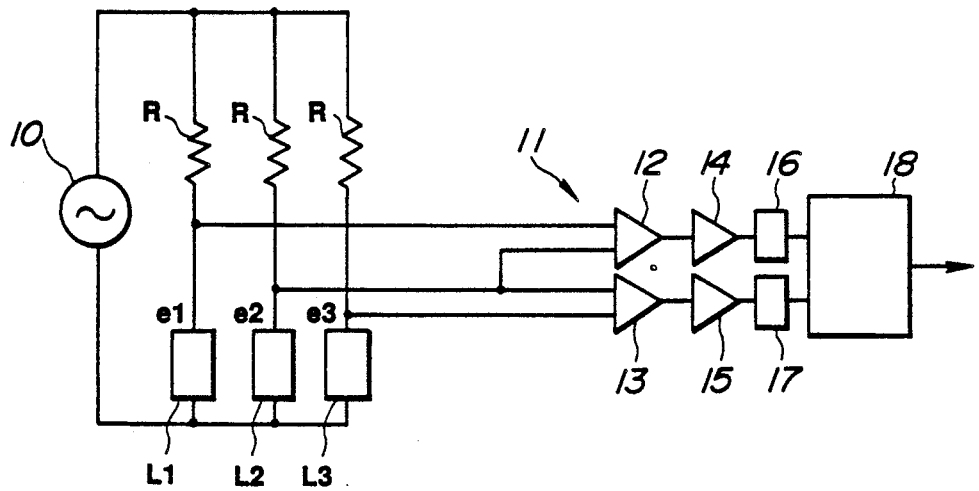
FIG. 32 is a circuit diagram of the sensor circuit to be employed in the sensor system of FIG. 31.
Figure 33:
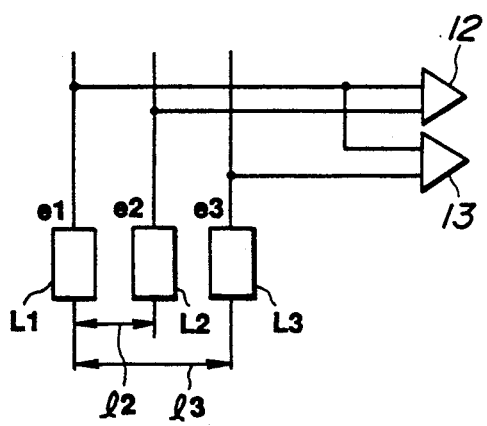
FIG. 33 is a block diagram showing a variation of circuit connection between the detector coils and comparator circuits in FIG. 32.

FIGS. 31 and 32 show the fifth embodiment of the magnetostriction type torque sensor system according to the present invention. The embodiment shown of the magnetostriction type torque sensor system employs three detector coils L1, L2 and L3. In the embodiment shown, two positive polarity anisotropy sections 4 and one negative polarity anisotropy section s oriented between the positive polarity anisotropy sections 4, are provided.

As shown in FIG. 32, the coils L1, L2 and L3 are connected to the power source 10 via respectively associated resistors R. The junctions between the coils L1 and L3 and resistors R are respectively connected to the comparator circuits 12 and 13. On the other hand, the junction between the coil L2 and the resistor R is commonly connected to the comparator circuits 12 and 13. In the practical connection, the coil L1 is connected to the inverting input terminal of the comparator circuit 12. The non-inverting input terminal of the comparator circuit 12 is connected to the coil L2. The coil L2 is also connected to the inverting input terminal of the comparator circuit 13. The coil L3 is connected to the non-inverting input terminal of the comparator circuit 13.

The circuit construction in the arithmetic circuit 11 including the comparator circuits 12 and 13, the level adjusting circuits 14 and 15, the rectifier circuits 16 and 17 and the comparator circuit 18, is substantially the same as that disclosed with respect to FIG. 2.

In the practical measurement of the applied torque, the output signals $e_1$, $e_2$ and $e_3$ of the coils L1, L2 and L3 are input to the comparator circuits 12 and 13. The rotary shaft 1 has a temperature gradient with a temperature distribution to vary the temperature at various positions. For example, the rotary shaft 1 has temperature gradient as illustrated in FIG. 31. The relationships between the positions of the coils L1, L2 and L3 and the voltage differences $\Delta et_2$ and $\Delta et_3$ of the output voltages $e_2$ and $e_3$ of the coils L2, and L3 and the output voltage $e_1$ of the coil L1 are similar to that shown in FIG. 3. Assuming no rotational torque is applied to the rotary shaft 1, the voltage differences $\Delta et_2$ and $\Delta et_3$ are caused simply depending upon the temperature difference. Further assuming the output voltage of the coil L1 being $e_0$, and the output voltage variations in the coils L1, L2 and L3 when the torque is applied, are $+T_1$, $+T_2$ and $+T_3'$ the output voltages $e_1$, $e_2$ and $e_3$ can be described by:

$$e_1 = e_0 + T_1$$

$$e_2 = e_0 + \Delta et_2 + T_2$$

$$e_3 = e_0 + \Delta et_3 + T_3$$

The distances to the coils L2 and L3 from the coil L1 are respectively $\chi_2$ and $\chi_3$. Since the temperature gradient in the example shown in FIG. 1 is linear, the following relationship can be described:

$$\Delta et_2/\chi_2 = et_3/\chi_3$$

$$\Delta et_3 = \Delta et_2 \times \chi_3/\chi_2$$

From the above foregoing equations, $\Delta et_2$ is removed to establish the following equation:

$$(\chi'-\chi_2)(e_2-e_1)-\chi_2(e_3-e_2) = (\chi_3-\chi_2)$$
$$)(T_2-T_1)-\chi_2(T_3-T_2) \quad (9)$$

Here, assuming $\chi_4-\chi_3=k_7$, $\chi_2=k_8$, the equation (3) can be modified to:

$$k_7(e_2-e_1)-k_8(e_3-e_2) = k_7(T_1-T_1)-k_8(T_3-T_2) \quad (10)$$

where $(k_7=\chi_3-\chi_2, k_8=\chi_2)$

As will be appreciated herefrom, in the embodiment shown, the four coils L1, L2, L3 and L4 serve not only for monitoring the torque applied to the associated sections 6, 4, 7 and 5 of the rotary shaft 1, but also for compensating for the temperature gradient dependent error.

In the embodiment shown, $k_1$ and $k_2$ can be set as gain of the level adjusting circuits 14 and 15. In practice, the values of $k_1$ and $k_2$ are set depending upon the distance between coils L1, L2 and L3. The right side segment of the equation (10) is an arithmetic operation done by the comparator circuit 18. As will be seen from right side segment, the temperature gradient dependent error can be eliminated. Therefore, the output of the first embodiment of the magnetostriction type torque sensor, according to the present invention, can represent magnetic permeability purely depending upon the magnetostriction caused by application of the rotational torque.

In the first embodiment of the torque sensor system of FIG. 1, the coils L1 and L3 are provided at the sections where positive polarity of magnetic anisotropy is provided. Therefore, the coils L1 and L3 provide positive output signals. On the other hand, since the coil L2 is associated with the section where the negative polarity of magnetic anisotropy is provided, the output signal of the coil L2 becomes negative. Therefore, the torque dependent values are $T_1=T$, $T_2=-T$ and $T_3=T$. Therefore, assuming $\chi_3-\chi_2=\chi_2$, the equation (10) can be modified as:

$$(e_2-e_1)-(e_3-e_2)=-4T$$

Therefore, the resultant torque sensor system output becomes four times that which can be obtained from single coil L2.

FIG. 31 shows a modification of the circuit connection for connecting the coils L1, L2 and L3. In the modification shown, the coil L2 is connected to the comparator circuit 12. On the other hand, the coil L3 is connected to the comparator circuit 13. The coil L1 is connected to both of the comparator circuits 12 and 13. In this case, the foregoing equation (10) can be modified as:

$$k_9(e_2-e_1)-k_{10}(e_3-e_1)=k_9(T_2-T_1)-k_{10}(T_3-T_1) \quad (11)$$

where $(k_9=\chi_3, k_{10}=\chi^2)$

Here assuming that $\chi_2=\chi$ and $\chi_3=2\chi$, the foregoing equation (11) can be modified as:

$$2(e_2-e_1)-(e_3-e_1)=-T_1+2T_2-T_3$$

From this, avoidance of the influence of the temperature gradient dependent error can be successfully achieved.

Figure 34:
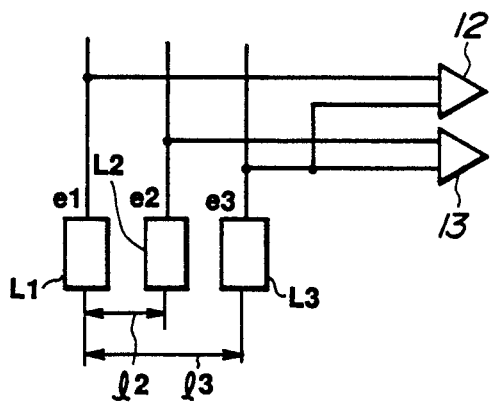
FIG. 34 is a block diagram showing another variation of circuit connection between the detector coils and comparator circuits in FIG. 32.

FIG. 34 is another modification of the circuit connection of the fifth embodiment of the magnetostriction type torque sensor system according to the invention. In the modification, the coil L1 is connected to the comparator circuit 12. On the other hand, the coil L2 is connected to the comparator circuit 13. The coil L3 is connected to both of the comparator circuits 12 and 13. In this case, the foregoing equation (10) can be modified as:

$$k_{11}(e_3-e_1)-k_{12}(e_3-e_2)=k_{11}(T_3-T_1)-k_{12}(T_3-T_2) \quad (12)$$

where $(k_{11}=\chi_3-\chi_2, k_{12}=\chi_3)$

Here assuming that $\chi_2=\chi$ and $\chi_3=2\chi$, the foregoing equation (12) can be modified as:

$$(e_3-e_1)-2(e_3-e_2)=-T_1+2T_2-T_3$$

A Large number of circuit connections of the coils and comparator circuits are possible. In the fifth embodiment of the torque sensor system, twenty-six $(=3^3-1)$ combinations can be possible. Among these twenty-six combinations, seven combinations are shown in the appended table 2.

Figure 35:
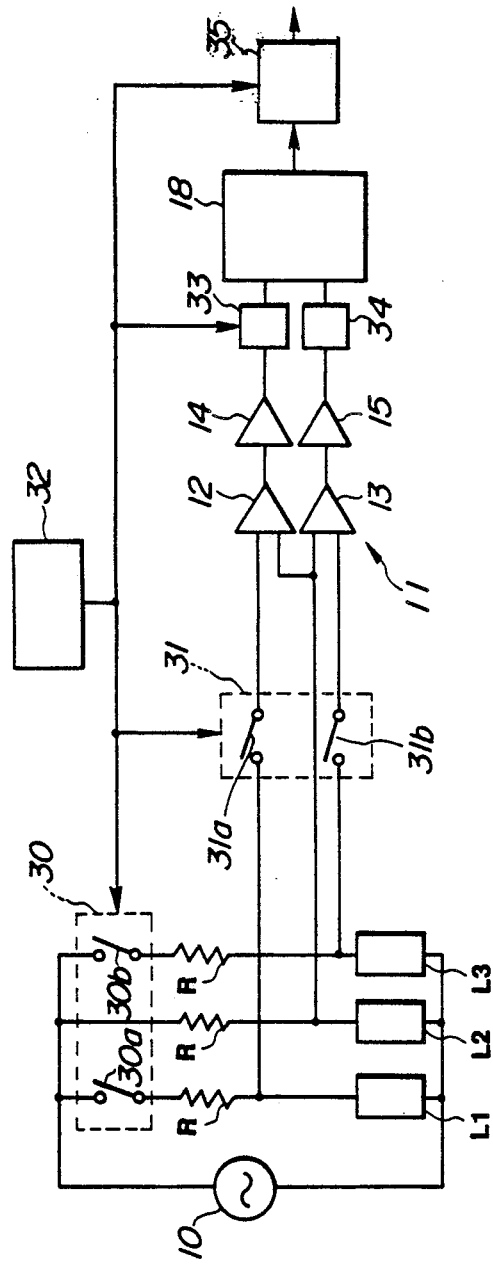
FIG. 35 is a block diagram of a modification of the sensor circuit of FIG. 32.

FIG. 35 shows a modification of the torque sensor circuit to be employed in the fifth embodiment of the magnetostriction type torque sensor system according to the present invention. In this embodiment, a switch assembly 30 is provided in the power circuit for the coils L1, L2 and L3. As will be seen from FIG. 35, the switch assembly 30 has two switching elements 30a and 30b disposed between the power source 10 and the coils L1 and L3. The coil L2 is constantly connected to the power source 10 in the embodiment shown. The embodiment shown also employs a switch assembly 31 which has two switching elements 31a and 31b disposed between the coil L1 and the comparator circuit 12 and between the coil L3 and the comparator circuit 13. These switch assemblies 30 and 31 are controlled as to the switch positions by the timing signal from the switching circuit 32. The circuit construction of the arithmetic circuit 11 is substantially the same as that illustrated in FIG. 10.

By providing the switch assembly 30, the coils L1 and L3 are selectively excited. By this the influence of the interference of magnetic fields can be successfully canceled as set out with respect to FIG. 10.

Figure 37:
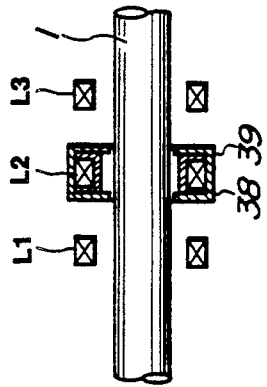
FIGS. 36, 37 and 38 are illustrations showing variations of the fifth embodiments of the torque sensor system of FIG. 31.
Figure 36:
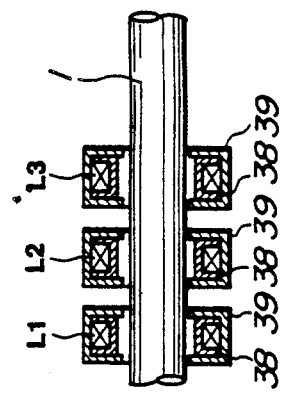
Figure 38:
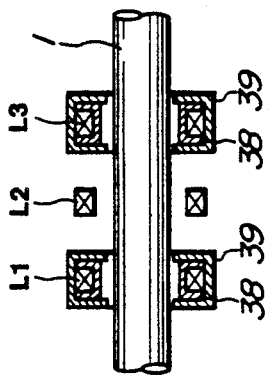

FIGS. 36, 37, 38 and 39 are modifications of the foregoing fifth embodiment of the magnetostriction type torque sensor system according to the invention. In these modifications, at least one of the coils among the three coils L1, L2 and L3 is shielded by the magnetic shield 39. Namely, in the example of FIG. 36, respective coils L1, L2 and L3 are supported by the coil bobbins 38 and magnetically shielded by means of magnetic shields 39. In the example of FIG. 37, only coil L2 is supported by the coil bobbin 38 and shielded by the magnetic shield 39. In the example of FIG. 38, the coils L1 and L3 are supported by the coil bobbins 38 with the magnetic shields 39. In the alternative embodiment of FIG. 39, each coil L1, L2 and L3 is supported by an individual coil bobbin 38. These coils L1, L2 and L3 are covered by a common magnetic shield 40.

Figure 40:
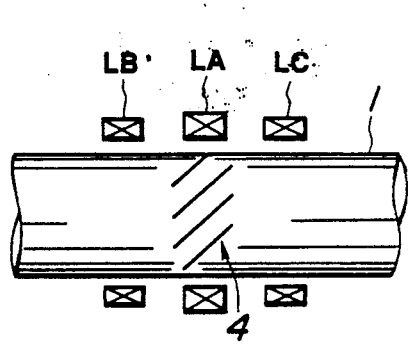
FIG. 40 is a sixth embodiment of the magnetostriction type torque sensor system according to the invention.
Figure 39:
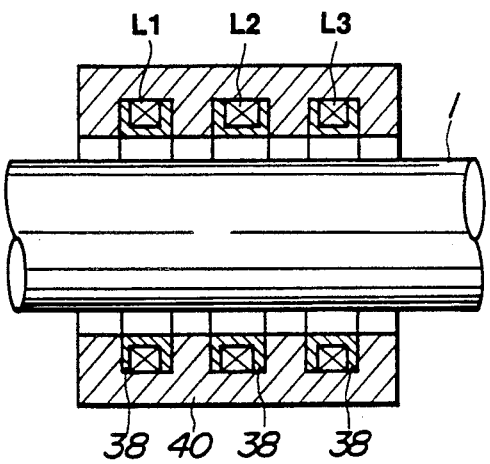
FIG. 39 is an illustration showing a further variation of the torque sensor system of FIG. 36.
Figure 41:
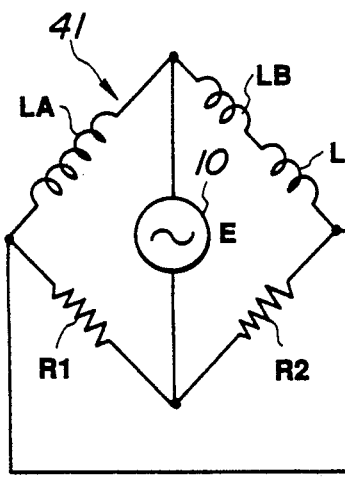
FIG. 41 is a block diagram of the sensor circuit employed in the sixth embodiment of the sensor system of FIG. 40.

FIGS. 40 and 41 show the sixth embodiment of the magnetostriction type torque sensor system according to the invention. In the embodiment shown, only one magnetic anisotropy section 4 is formed in the rotary shaft 1. The torque detector coil LA opposes the magnetic anisotropy section 4. On the other hand, the temperature gradient dependent error compensation coils LB and LC are provided to oppose the sections at both sides of the magnetic anisotropy section 4 where no magnetic anisotropy is provided. The impedances of the coils LB and LC are equal to each other and set at half of the impedance of the coil LA. The distances between the coils LB and LA and between the coils LA and LC are equal to each other.

As seen from FIG. 41, the coils LA, LB and LC form the bridge circuit 41 with the resistors $R_1$ and $R_2$ and the power source 10. As seen, the coil LA is connected in series with the resistor $R_1$ with respect to the power source 10. On the other hand, the coils LB and LC and the resistor $R_2$ are connected in series with respect to the power source 10. Junctions between the coil LA and the resistor $R_1$ and between the coil LC and the resistor $R_2$ are connected to an arithmetic circuit 53. The arithmetic circuit 53 may comprise a phase detector or a differential amplifier. The arithmetic circuit 53 is connected to an output correction circuit 54.

Figure 43:
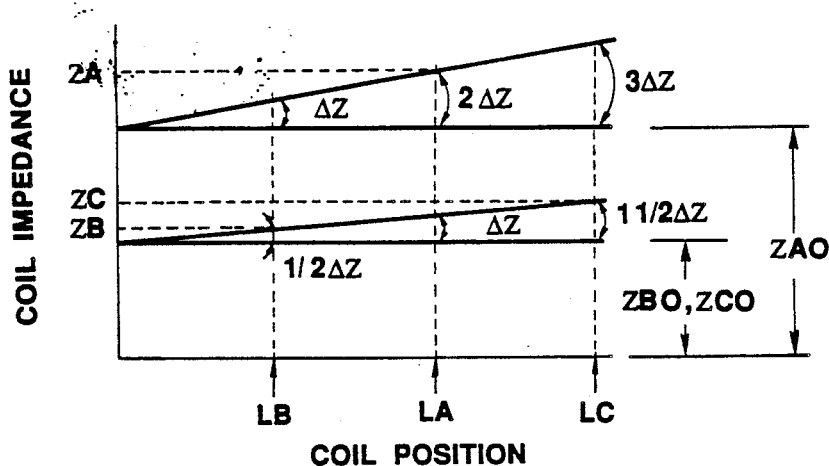
FIG. 43 is a graph showing the relationship between the position of the detector coil and the coil impedance.

In the aforementioned circuit construction, assuming there is no temperature gradient in the rotary shaft 1, respective impedances $Z_{AO}$, $Z_{BO}$ and $Z_{CO}$ of the coils LA, LB and LC are $Z_{AO}/2=Z_{BO}=Z_{CO}$, as shown in FIG. 43. Therefore, the output $E_0$ of the bridge circuit 41 can be illustrated as:

$$E_0 = E \times R_2/(R_2+R_3) - E \times R_1/(R_1+R_4) = E(R_2R_4 - R_1R_3)/(R_2+R_3)(R_1+R_4)$$

where $Z_{AO} = R_4$, $Z_{BO} + Z_{CO} = R_3$

Here, if $R_2R_4 = R_1R_3$, balance of the bridge cannot be broken. Furthermore, since $R_1 = R_2$ balance of the bridge cannot be broken if $R_3 = R_4$.

When there is a temperature gradient in the rotary shaft 1, the impedances $Z_A$, $Z_B$ and $Z_C$ of respective coils LA, LB and LC can be illustrated as, $$Z_A = Z_{AO} + 2\Delta Z$$

$$Z_B = Z_{BO} + \tfrac{1}{2}\Delta Z$$

$$Z_C = Z_{CO} + (1+\tfrac{1}{2})\Delta Z$$

Here, $$Z_B = Z_C = Z_{BO} + Z_{CO} + 2\Delta Z = Z_{AO} + 2\Delta Z = Z_A$$

As will be appreciated herefrom, even when the temperature gradient exists in the rotary shaft 1, the temperature gradient dependent error cannot be created.

Figure 42A:
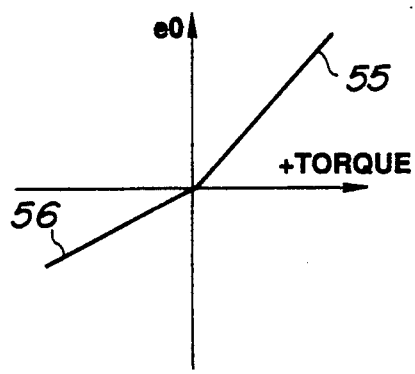
FIGS. 42(a) and 42(b) are charts showing the relationship between the applied torque and outputs in a torque measuring circuit and an output correction circuit in the circuit of FIG. 39.
Figure 42B:
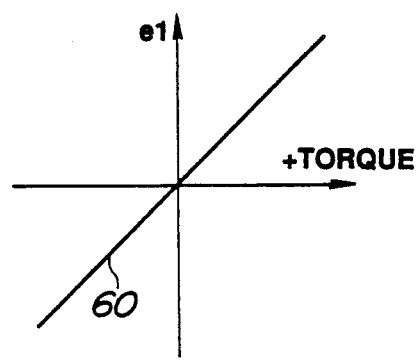

In the embodiment which has only one magnetic anisotropy section, when the direction of the torque applied to the rotary shaft acts in an expanding direction, the output of the arithmetic circuit 53 becomes that illustrated by line 55 in FIG. 42(a). On the other hand, when the torque is exerted in a compressing direction, the output $e_0$ of the arithmetic circuit 53 becomes that illustrated by line 56 in FIG. 42(b). The output correction circuit 54 modifies the output level $e_0$ from the pattern of line 55 into the pattern of line 56. Therefore, the output $e_1$ of the output correction circuit 54 always has linear variation characteristics.

Figure 44:
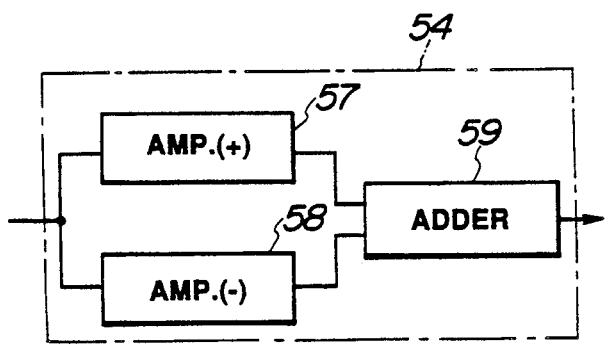
FIG. 44 is a block diagram of the output correction circuit employed in the sensor circuit of FIG. 41.

FIG. 44 shows one example of the output correction circuit 54. In the example shown, the output correction circuit 54 comprises a positive amplifier 57, a negative amplifier 58 and an adder 59. In this construction, the positive amplifier 57 amplifies only positive values of the output signal received from the arithmetic circuit 53. On the other hand, the negative amplifier amplifies only negative values of the output signal received from the arithmetic circuit 53. Amplification of the negative amplifier 58 is set to make the negative value signal vary at the same gradient as the positive value.

Figure 45:
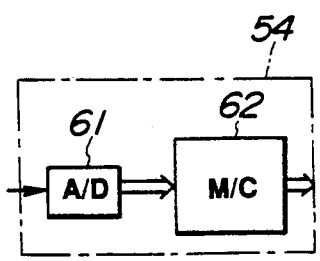
FIG. 45 is a block diagram of a modification of the output correction circuit of FIG. 44.

FIG. 45 shows another example of the output correction circuit 54 to be employed in the sixth embodiment of the magnetostriction type torque sensor system of the invention. In this example, the output signal of the arithmetic circuit 53 in analog form is converted into a digital signal by A/D converter 61. The digital signal is fed to the microprocessor 62. The microprocessor 62 is programmed for providing linear characteristics of the output signal of the arithmetic circuit 53.

Figure 46:
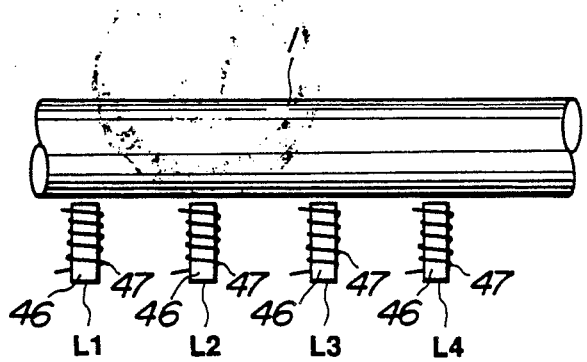
FIG. 46 is a seventh embodiment of the magnetostriction type torque sensor of the invention.
Figure 47:
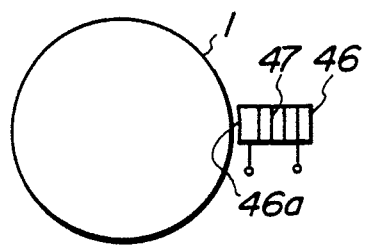
FIG. 47 is a side elevation of the torque sensor system of FIG. 46.
Figure 48:
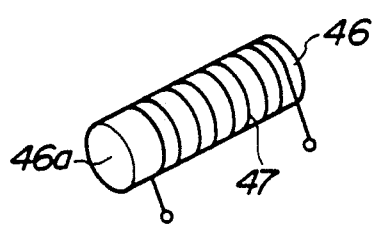
FIG. 48 is a perspective illustration showing one typical coil to be employed.

FIGS. 46 and 47 show modifications of the torque detector coil and installation of the coil. As shown in FIG. 48, the coil comprises a bar shaped core 46 and a coil 47 wound therearound. The coil constructed as shown in FIG. 48 is installed in the vicinity of the rotary shaft 1 with a predetermined and substantially small gap between the tip end 46a of the core and the peripheral surface of the shaft.

Although the example shown employs a cross sectionally circular cylindrical core, the sectional configuration of the core can be any desired configuration.

Figure 49:
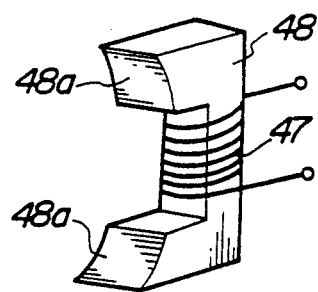
FIG. 49 is a perspective illustration of a modified construction for the torque detector coil.
Figure 50:
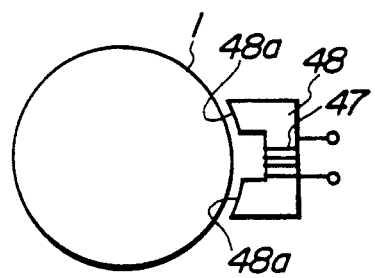
FIG. 50 is a side elevation of the detector coil of FIG. 49 as applied for monitoring magnetostriction magnitude.

FIGS. 49 and 50 show another example of the magnetic coil and application thereof. As seen, the coil comprises an essentially C-shaped core 48 and a coil 47 wound around the core. The core has tip ends 48a, 48b opposing the peripheral surface of the rotary shaft 1.

The modified constructions of the coils shown in FIGS. 46, 47, 48, 49 and 50 are applicable for any of the former embodiments of the torque sensor systems. These modified constructions of the coils are easier in installation relative to the rotary shaft for measurement.

Figure 51:
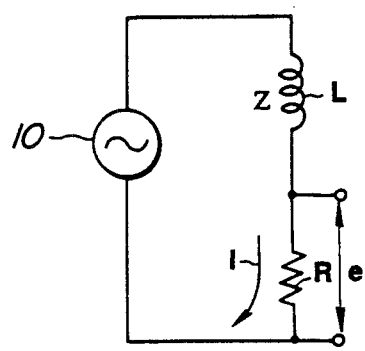
FIG. 51 is a circuit diagram showing the circuit of the torque detector coil.

FIG. 51 shows the fundamental circuit of the torque sensor. As set forth above, the rotational torque is applied to the rotary shaft which serves as torsional stress for the shaft. This stress results in magnetostriction in the rotary shaft to vary magnetic permeability. Basically, the magnetic permeability is proportional to the torque applied to the shaft. On the other hand, the impedance of the detector coil is proportional to the magnetic permeability of the rotary shaft. In the circuit shown, the relationship between the power source voltage E, the current flowing through the circuit I, and the voltage e at the ends of the resistor R can be illustrated by:

$$e = E \times R/\sqrt{Z^2 + R^2} \;,\; I = E/\sqrt{Z^2 + R^2}$$

where E and R are constant.

As will be appreciated herefrom, through the embodiment utilizing impedance for deriving the applied torque on the basis of the output signals of the coils, either one of the voltage or current can be used as a parameter representative of the applied torque.

As set forth, the present invention fulfills all of the objects and advantages sought therefor.

While the present invention has been disclosed in terms of the preferred embodiment in order to facilitate better understanding of the invention, it should be appreciated that the invention can be embodied in various ways without departing from the principle of the invention. Therefore, the invention should be understood to include all possible embodiments and modifications to the embodiments shown which can be embodied without departing from the principle of the invention set out in the appended claims.

TABLE 1

| Ex. No. | Number | Magnetic Anisotropy Arrangement | Polarity | Applied Equation (5) Tq | Applicability | (4) or (6) Tq | Applicability |
|---|---|---|---|---|---|---|---|
| 1 | + : 1 | / | + | −T | o | −T | o |
| 2 |  | / | + | 3T | o | T | o |
| 3 | + : 2 | / / | + + | 2T | o | 0 | x |
| 4 |  | / / | + + | −4T | o | 0 | x |
| 5 |  | / / | + + | 0 | x | −2T | o |
| 6 |  | / / | + + | 0 | x | 2T | o |
| 7 | + : 1 | / | + − | −4T | o | −2T | o |
| 8 | − : 1 | / | + − | 2T | o | −2T | o |

TABLE 1-continued

| | | Magnetic Anisotropy | | Applied Equation | | | |
|---|---|---|---|---|---|---|---|
| | | | | (5) | | (4) or (6) | |
| Ex. No. | Number | Arrangement | Polarity | Tq | Applicability | Tq | Applicability |
| 9 | | / | + − − | −2T | o | 0 | x |
| 10 | | / | + + − | 6T | o | 0 | x |
| 11 | + : 3 | / / / | + + + | −T | o | T | o |
| 12 | | / / / | + + + + | 3T | o | −T | o |
| 13 | + : 2 | / / | + + − | 5T | o | −T | o |
| 14 | − : 1 | / / | + + − | T | o | T | o |
| 15 | | / / | + − + | −3T | o | −3T | o |
| 16 | | / / | + + − | −5T | o | T | o |
| 17 | + : 4 | / / / / | + + + + | 0 | x | 0 | x |
| 18 | + : 3 | / / / | + + + − | −2T | o | 2T | o |
| 19 | − : 1 | / / / | + + − + | 6T | o | −2T | o |
| 20 | + : 2 | / / | + + − − | 4T | o | 0 | x |
| 21 | − : 2 | / / | + − + − | −8T | o | 0 | x |
| 22 | | / / | + − − + | 0 | x | −4T | o |

TABLE 2

| | Magnetic Anisotropy | | |
|---|---|---|---|
| Ex. No. | Arrangement | Polarity | Torque |
| 1 | / | + | −T |
| 2 | / / | + + | T |
| 3 | / | + − | −3T |
| 4 | / / | + − + | −4T |
| 5 | / | + − − | −2T |
| 6 | / | + + | 2T |
| 7 | / / | + + | −2T |

What is claimed is:

1. A magnetostriction type torque sensor for monitoring rotational torque applied to a rotating object comprising:
    at least one magnetic anisotropy section formed in said rotating object;
    a plurality of electromagnetic coils disposed in the vicinity of said rotating object, one of said electromagnetic coils opposing said magnetic anisotropy section, each of said coils establishing a magnetic loop extending through said rotating object for monitoring a magnitude of magnetostriction caused by torsional deformation caused in said rotating object due to said rotational torque, each coil producing output signals representative of a monitored magnetostriction magnitude and including a temperature gradient dependent noise component;
    means for processing said output signals of said electromagnetic coils in combination for removing said noise components contained in respective output signals of said electromagnetic coils;
    means for deriving a value of said rotational torque applied to said rotating object on the basis of said output signals from which said noise components have been removed and producing a rotational torque indicative signal.

2. A magnetostriction type torque sensor system as set forth in claim 1, which further comprises a magnetic shield magnetically shielding at least one of said coils.

3. A magnetostriction type torque sensor system as set forth in claim 1, in which said at least one section comprises two magnetic anisotropy sections formed in said rotating object, and said coils comprise four electromagnetic coils, two of said four coils opposing said magnetic anisotropy sections and the remaining two of said four coils opposing general sections where no magnetic anisotropy is provided, and a bridge circuit including said four coils.

4. A magnetostriction type torque sensor system as set forth in claim 3, wherein said coils being so arranged in said bridge for removing said temperature dependent components of said output signals of said coils.

5. A magnetostriction type torque sensor system as set forth in claim 4, wherein said four coils are aligned in axial alignment, a first pair of said four coils which are located at the ends of said aligned coils having a given impedance relative to the impedance of a second pair of said four coils which are located between said first pair, said given impedance being determined at a ratio relative to said impedance of said second pair, corresponding to the ratio of the distance between said second pair versus the distance between said first pair.

6. A magnetostriction type torque sensor system as set forth in claim 1, in which said at least one section comprises four magnetic anisotropy sections formed in said rotating object, and said coils comprise four electromagnetic coils respectively opposing said magnetic anisotropy sections, and a bridge circuit including said four coils.

7. A magnetostriction type torque sensor system as set forth in claim 6, wherein said coils being so arranged in said bridge for removing said temperature dependent components of said output signals of said coils.

8. A magnetostriction type torque sensor system as set forth in claim 7, wherein said four coils are aligned in axial alignment, a first pair of said four coils which are located at the ends of said aligned coils having a given impedance relative to the impedance of a second pair of said four coils which are located between said first pair, said given impedance being determined at a ratio relative to said impedance of said second pair corresponding to the ratio of the distance between said second pair versus the distance between said first pair.

9. A magnetostriction type torque sensor system as set forth in claim 1, wherein said means for processing said output signals comprises means for detecting temperatures at a plurality of points in said rotating object for deriving a temperature gradient existing in said rotating object, said temperature gradient being utilized by said means for processing for determining a correction value for removing said noise components.

10. A magnetostriction type torque sensor for monitoring rotational torque exerted on an objective rotary body, comprising:
    a first section formed on said rotary body, said first section having a magnetic anisotropy property;

a second section formed on said rotary body located at a position distanced from said first section at a first known distance;

a third section formed on said rotary body located at a position distanced from said first section at a second known distance;

a first electromagnetic coil disposed in the vicinity of said first section for generating a first magnetic field and producing a first signal having a first value variable depending upon a magnitude of magnetostriction caused by rotational torque exerted on said rotary body, said first value including a first torque dependent component and a first temperature gradient dependent noise component;

a second electromagnetic coil disposed in the vicinity of said second section for generating a second magnetic field and producing a second signal having a second value variable depending upon a magnitude of magnetostriction caused by rotational torque exerted on said rotary body, said second value including a second torque dependent component and a second temperature gradient dependent noise component;

a third electromagnetic coil disposed in the vicinity of said third section for generating a third magnetic field and producing a third signal having a third value variable depending upon a magnitude of magnetostriction caused by rotational torque exerted on said rotary body, said third value including a third torque dependent component and a third temperature gradient dependent noise component; and sensor circuit means receiving said first, second and third signals and processing said received first, second, and third signals in combination for removing said first, second and third temperature gradient dependent noise components contained in respective ones of said first, second and third signals and for deriving an applied torque indicative signal on the basis of said first, second and third signals from which said temperature gradient dependent noise components are removed.

11. A magnetostriction type torque sensor system as set forth in claim 10, wherein said first, second and third sections are oriented with known axial intervals to each adjacent section.

12. A magnetostriction type torque sensor system as set forth in claim 10, wherein at least one of said first, second and third electromagnetic coils is magnetically shielded from an adjacent coil.

13. A magnetostriction type torque sensor system as set forth in claim 10, which further comprises a switching assembly disposed in a power supply circuit for connecting respective ones of said first, second and third coils so as to selectively establish and break said power supply circuit.

14. A magnetostriction type torque sensor system as set forth in claim 13, wherein said switching assembly is connected to a switching control means for controlling power supply timing for said respective first, second and third electromagnetic coils so that mutual interference of magnetic fields formed by adjacent ones of said coils is canceled.

15. A magnetostriction type torque sensor system as set forth in claim 14, wherein said switching assembly has two switching elements connected in series with respective ones of said first, second and third coils with respect to a power source in said power supply circuit, said respective ones of said first, second and third coils being located at both axial sides of a remaining coil which is constantly connected to said power source.

16. A magnetostriction type torque sensor system as set forth in claim 10, wherein said sensor circuit means comprises means for deriving a temperature gradient on the basis of a difference of said first, second and third signals and for deriving a magnitude of said temperature gradient dependent noise component on the basis of said derived temperature gradient and known distances between said first, second and third coils, and means for removing said derived first, second, and third temperature dependent components from said first, second and third signals.

17. A magnetostriction type torque sensor system as set forth in claim 16, wherein said means for deriving said temperature gradient comprises a pair of comparators respectively connected to different pairs of said first, second and third coils for deriving a difference between input signals from an associated pairs of coils, said difference being variable depending upon said temperature gradient in said rotary body.

18. A magnetostriction type torque sensor system as set forth in claim 17, wherein said sensor circuit means comprises a coefficient circuit which generates a coefficient for compensating for said temperature dependent components.

19. A magnetostriction type torque sensor system as set forth in claim 10, wherein said sensor circuit means includes a bridge circuit including said coils, said coils being so arranged in said bridge circuit as to cancel said first, second and third temperature dependent components.

* * * * *